(12) United States Patent
Prevost et al.

(10) Patent No.: US 11,274,731 B2
(45) Date of Patent: Mar. 15, 2022

(54) POLYCRYSTALLINE DIAMOND POWER TRANSMISSION SURFACES

(71) Applicant: Pi Tech Innovations LLC, Houston, TX (US)

(72) Inventors: Gregory Prevost, Spring, TX (US); Michael V. Williams, Conroe, TX (US); William W. King, Houston, TX (US); David P. Miess, Spring, TX (US)

(73) Assignee: Pi Tech Innovations LLC, Houston, TX (US)

( * ) Notice: Subject to any disclaimer, the term of this patent is extended or adjusted under 35 U.S.C. 154(b) by 0 days.

(21) Appl. No.: 17/331,399

(22) Filed: May 26, 2021

(65) Prior Publication Data

US 2021/0293307 A1 Sep. 23, 2021

Related U.S. Application Data

(63) Continuation of application No. 16/888,079, filed on May 29, 2020, now Pat. No. 11,054,000, which is a continuation-in-part of application No. 16/425,758, filed on May 29, 2019, now Pat. No. 11,035,407, which is a continuation-in-part of application No. 16/049,617, filed on Jul. 30, 2018, now Pat. No.

(Continued)

(51) Int. Cl.

| *F16D 3/16* | (2006.01) |
| *F16H 1/12* | (2006.01) |
| *F16H 1/20* | (2006.01) |
| *F16H 1/16* | (2006.01) |
| *F16H 1/14* | (2006.01) |

(52) U.S. Cl.
CPC ............. *F16H 1/20* (2013.01); *F16D 3/16* (2013.01); *F16H 1/16* (2013.01); *F16H 1/14* (2013.01)

(58) Field of Classification Search
CPC ..... F16H 1/04; F16H 1/14; F16H 1/16; F16H 1/20; F16H 1/203; F16H 1/206; F16H 1/24; F16D 3/16; F16D 3/26; F16D 3/28
See application file for complete search history.

(56) References Cited

U.S. PATENT DOCUMENTS

| 1,798,604 A | 3/1931 | Hoke |
| 1,963,956 A | 6/1934 | James |

(Continued)

FOREIGN PATENT DOCUMENTS

| CA | 2891268 A1 | 11/2016 |
| JP | 06174051 A | 6/1994 |

(Continued)

OTHER PUBLICATIONS

Bovenkerk, Dr. H. P.; Bundy, Dr. F. P.; Hall, Dr. H. T.; Strong, Dr. H. M.; Wentorf, Jun., Dr. R. H.; Preparation of Diamond, Nature, Oct. 10, 1959, pp. 1094-1098, vol. 184.

(Continued)

*Primary Examiner* — Adam D Rogers
(74) *Attorney, Agent, or Firm* — Michael S. McCoy; Amatong McCoy LLC

(57) ABSTRACT

Power transmission systems are provided that include polycrystalline diamond power transmission surfaces that are engaged with diamond solvent-catalyst power transmission surfaces. The power transmission systems may be or include gears, universal joints, or other power transmission systems or components.

33 Claims, 12 Drawing Sheets

Related U.S. Application Data 10,760,615, and a continuation-in-part of application No. 16/049,588, filed on Jul. 30, 2018, now Pat. No. 10,465,775, and a continuation-in-part of application No. 16/049,608, filed on Jul. 30, 2018, now Pat. No. 10,738,821, said application No. 16/888,079 is a continuation-in-part of application No. 16/049,617, filed on Jul. 30, 2018, now Pat. No. 10,760,615.

(56) References Cited

U.S. PATENT DOCUMENTS

| | | |
|---|---|---|
| 2,259,023 A | 10/1941 | Clark |
| 2,299,978 A | 10/1942 | Hall |
| 2,407,586 A | 9/1946 | Summers |
| 2,567,735 A | 9/1951 | Scott |
| 2,693,396 A | 11/1954 | Gondek |
| 2,758,181 A | 8/1956 | Crouch |
| 2,788,677 A | 4/1957 | Hayek |
| 2,877,662 A | 3/1959 | Eduard |
| 2,897,016 A | 7/1959 | Baker |
| 2,947,609 A | 8/1960 | Strong |
| 2,947,610 A | 8/1960 | Hall et al. |
| 3,559,802 A | 2/1971 | Eidus |
| 3,582,161 A | 6/1971 | Hudson |
| 3,603,652 A | 9/1971 | Youden |
| 3,650,714 A | 3/1972 | Farkas |
| 3,697,141 A | 10/1972 | Garrett |
| 3,707,107 A | 12/1972 | Bieri |
| 3,741,252 A | 6/1973 | Williams |
| 3,745,623 A | 7/1973 | Wentorf et al. |
| 3,752,541 A | 8/1973 | Mcvey |
| 3,866,987 A | 2/1975 | Gamer |
| 3,869,947 A | 3/1975 | Vandenkieboom |
| 3,920,290 A | 11/1975 | Evarts |
| 4,085,634 A | 4/1978 | Sattler |
| 4,182,537 A | 1/1980 | Oster |
| 4,225,322 A | 9/1980 | Knemeyer |
| 4,238,137 A | 12/1980 | Furchak et al. |
| 4,285,550 A | 8/1981 | Blackburn et al. |
| 4,364,136 A | 12/1982 | Hattan |
| 4,398,772 A | 8/1983 | Odell |
| 4,410,054 A | 10/1983 | Nagel et al. |
| 4,410,284 A | 10/1983 | Herrick |
| 4,428,627 A | 1/1984 | Teramachi |
| 4,432,682 A | 2/1984 | McKewan |
| 4,468,138 A | 8/1984 | Nagel |
| 4,554,208 A | 11/1985 | MacIver et al. |
| 4,560,014 A | 12/1985 | Geczy |
| 4,620,601 A | 11/1986 | Nagel |
| RE32,380 E | 3/1987 | Wentorf, Jr. et al. |
| 4,662,348 A | 5/1987 | Hall et al. |
| 4,679,639 A | 7/1987 | Barr et al. |
| 4,689,847 A | 9/1987 | Huber |
| 4,720,199 A | 1/1988 | Geczy et al. |
| 4,729,440 A | 3/1988 | Hall |
| 4,732,490 A | 3/1988 | Masciarelli |
| 4,764,036 A | 8/1988 | McPherson |
| 4,796,670 A | 1/1989 | Russell et al. |
| 4,797,011 A | 1/1989 | Saeki et al. |
| 4,858,688 A | 8/1989 | Edwards et al. |
| 4,906,528 A | 3/1990 | Cerceau et al. |
| 4,958,692 A | 9/1990 | Anderson |
| 5,011,514 A | 4/1991 | Cho et al. |
| 5,011,515 A | 4/1991 | Frushour |
| 5,030,276 A | 7/1991 | Sung et al. |
| 5,037,212 A | 8/1991 | Justman et al. |
| 5,066,145 A | 11/1991 | Sibley et al. |
| 5,067,826 A | 11/1991 | Lemelson |
| 5,092,687 A | 3/1992 | Hall |
| 5,112,146 A | 5/1992 | Stangeland |
| 5,123,772 A | 6/1992 | Anderson |
| 5,151,107 A | 9/1992 | Cho et al. |
| 5,176,483 A | 1/1993 | Baumann et al. |
| 5,193,363 A | 3/1993 | Petty |
| 5,205,188 A | 4/1993 | Repenning et al. |
| 5,253,939 A | 10/1993 | Hall |
| 5,271,749 A | 12/1993 | Rai et al. |
| 5,351,770 A | 10/1994 | Cawthorne et al. |
| 5,358,041 A | 10/1994 | O'Hair |
| 5,358,337 A | 10/1994 | Codatto |
| 5,375,679 A | 12/1994 | Biehl |
| 5,385,715 A | 1/1995 | Fish |
| 5,447,208 A | 9/1995 | Lund et al. |
| 5,462,362 A | 10/1995 | Yuhta et al. |
| 5,464,086 A | 11/1995 | Coelln |
| 5,522,467 A | 6/1996 | Stevens et al. |
| 5,533,604 A | 7/1996 | Brierton |
| 5,538,346 A | 7/1996 | Frias et al. |
| 5,540,314 A | 7/1996 | Coelln |
| 5,560,716 A | 10/1996 | Tank et al. |
| 5,618,114 A | 4/1997 | Katahira |
| 5,645,617 A | 7/1997 | Frushour |
| 5,653,300 A | 8/1997 | Lund et al. |
| 5,715,898 A | 2/1998 | Anderson |
| 5,833,019 A | 11/1998 | Gynz-Rekowski |
| 5,855,996 A | 1/1999 | Corrigan et al. |
| 5,948,541 A | 9/1999 | Inspektor |
| 6,045,029 A | 4/2000 | Scott |
| 6,109,790 A | 8/2000 | Gynz-Rekowski et al. |
| 6,120,185 A | 9/2000 | Masciarelli, Jr. |
| 6,129,195 A | 10/2000 | Matheny |
| 6,152,223 A | 11/2000 | Abdo et al. |
| 6,164,109 A | 12/2000 | Bartosch |
| 6,209,185 B1 | 4/2001 | Scott |
| 6,279,716 B1 | 8/2001 | Kayatani et al. |
| 6,378,633 B1 | 4/2002 | Moore et al. |
| 6,409,388 B1 | 6/2002 | Lin |
| 6,457,865 B1 | 10/2002 | Masciarelli, Jr. |
| 6,488,103 B1 | 12/2002 | Dennis et al. |
| 6,488,715 B1 | 12/2002 | Pope et al. |
| 6,516,934 B2 | 2/2003 | Masciarelli, Jr. |
| 6,652,201 B2 | 11/2003 | Kunimori et al. |
| 6,655,845 B1 | 12/2003 | Pope et al. |
| 6,737,377 B1 | 5/2004 | Sumiya et al. |
| 6,764,219 B2 | 7/2004 | Doll et al. |
| 6,808,019 B1 | 10/2004 | Mabry |
| 6,814,775 B2 | 11/2004 | Scurlock et al. |
| 6,951,578 B1 | 10/2005 | Belnap et al. |
| 7,007,787 B2 | 3/2006 | Pallini et al. |
| 7,128,173 B2 | 10/2006 | Lin |
| 7,198,043 B1 | 4/2007 | Zhang |
| 7,234,541 B2 | 6/2007 | Scott et al. |
| 7,311,159 B2 | 12/2007 | Lin et al. |
| 7,441,610 B2 | 10/2008 | Belnap et al. |
| 7,475,744 B2 | 1/2009 | Pope |
| 7,552,782 B1 | 6/2009 | Sexton et al. |
| 7,703,982 B2 | 4/2010 | Cooley |
| 7,737,377 B1 | 6/2010 | Dodal et al. |
| 7,845,436 B2 | 12/2010 | Cooley et al. |
| 7,861,805 B2 | 1/2011 | Dick et al. |
| 7,870,913 B1 | 1/2011 | Sexton et al. |
| 8,069,933 B2 | 12/2011 | Sexton et al. |
| 8,109,247 B2 | 2/2012 | Wakade et al. |
| 8,119,240 B2 | 2/2012 | Cooper |
| 8,163,232 B2 | 4/2012 | Fang et al. |
| 8,277,124 B2 | 10/2012 | Sexton et al. |
| 8,277,722 B2 | 10/2012 | DiGiovanni |
| 8,365,846 B2 | 2/2013 | Dourfaye et al. |
| 8,480,304 B1 | 7/2013 | Cooley et al. |
| 8,485,284 B2 | 7/2013 | Sithebe |
| 8,613,554 B2 | 12/2013 | Tessier et al. |
| 8,627,904 B2 | 1/2014 | Voronin |
| 8,678,657 B1 | 3/2014 | Knuteson et al. |
| 8,701,797 B2 | 4/2014 | Baudoin |
| 8,734,550 B1 | 5/2014 | Sani |
| 8,757,299 B2 | 6/2014 | DiGiovanni et al. |
| 8,763,727 B1 | 7/2014 | Cooley et al. |
| 8,764,295 B2 | 7/2014 | Dadson et al. |
| 8,881,849 B2 | 11/2014 | Shen et al. |
| 8,939,652 B2 | 1/2015 | Peterson et al. |
| 8,974,559 B2 | 3/2015 | Frushour |
| 9,004,198 B2 | 4/2015 | Kulkarni |
| 9,010,418 B2 | 4/2015 | Pereyra et al. |
| 9,045,941 B2 | 6/2015 | Chustz |

(56) References Cited

U.S. PATENT DOCUMENTS

| | | | |
|---|---|---|---|
| 9,103,172 B1 | 8/2015 | Bertagnolli et al. |
| 9,127,713 B1 | 9/2015 | Lu |
| 9,145,743 B2 | 9/2015 | Shen et al. |
| 9,222,515 B2 | 12/2015 | Chang |
| 9,273,381 B2 | 3/2016 | Qian et al. |
| 9,353,788 B1 | 5/2016 | Tulett et al. |
| 9,366,085 B2 | 6/2016 | Panahi |
| 9,404,310 B1 | 8/2016 | Sani et al. |
| 9,410,573 B1 | 8/2016 | Lu |
| 9,429,188 B2 | 8/2016 | Peterson et al. |
| 9,488,221 B2 | 11/2016 | Gonzalez |
| 9,562,562 B2 | 2/2017 | Peterson |
| 9,643,293 B1 | 5/2017 | Miess et al. |
| 9,702,401 B2 | 7/2017 | Gonzalez |
| 9,732,791 B1 | 8/2017 | Gonzalez |
| 9,776,917 B2 | 10/2017 | Tessitore et al. |
| 9,790,749 B2 | 10/2017 | Chen |
| 9,790,818 B2 | 10/2017 | Berruet et al. |
| 9,803,432 B2 | 10/2017 | Wood et al. |
| 9,822,523 B1 | 11/2017 | Miess |
| 9,840,875 B2 | 12/2017 | Harvey et al. |
| 9,869,135 B1 | 1/2018 | Martin |
| 10,113,362 B2 | 10/2018 | Ritchie et al. |
| 10,294,986 B2 | 5/2019 | Gonzalez |
| 10,307,891 B2 | 6/2019 | Daniels et al. |
| 10,408,086 B1 | 9/2019 | Meier |
| 10,465,775 B1* | 11/2019 | Miess ................ F01L 1/14 |
| 10,683,895 B2 | 6/2020 | Hall et al. |
| 10,711,792 B2 | 7/2020 | Vidalenc et al. |
| 10,711,833 B2 | 7/2020 | Manwill et al. |
| 10,738,821 B2 | 8/2020 | Miess et al. |
| 10,807,913 B1 | 10/2020 | Hawks et al. |
| 10,968,700 B1 | 4/2021 | Raymond |
| 10,968,703 B2 | 4/2021 | Haugvaldstad et al. |
| 11,054,000 B2* | 7/2021 | Prevost ................ F16H 1/08 |
| 11,085,488 B2 | 8/2021 | Gonzalez |
| 2002/0020526 A1 | 2/2002 | Male et al. |
| 2003/0019106 A1 | 1/2003 | Pope et al. |
| 2003/0075363 A1 | 4/2003 | Lin et al. |
| 2003/0159834 A1 | 8/2003 | Kirk et al. |
| 2004/0031625 A1 | 2/2004 | Lin et al. |
| 2004/0163822 A1 | 8/2004 | Zhang et al. |
| 2004/0219362 A1 | 11/2004 | Wort et al. |
| 2004/0223676 A1 | 11/2004 | Pope et al. |
| 2006/0060392 A1 | 3/2006 | Eyre |
| 2006/0165973 A1 | 7/2006 | Dumm et al. |
| 2007/0046119 A1 | 3/2007 | Cooley |
| 2008/0217063 A1 | 9/2008 | Moore et al. |
| 2008/0253706 A1 | 10/2008 | Bischof et al. |
| 2009/0020046 A1 | 1/2009 | Marcelli |
| 2009/0087563 A1 | 4/2009 | Voegele et al. |
| 2009/0268995 A1 | 10/2009 | Ide et al. |
| 2010/0037864 A1 | 2/2010 | Dutt et al. |
| 2010/0276200 A1 | 11/2010 | Schwefe et al. |
| 2010/0307069 A1 | 12/2010 | Bertagnolli et al. |
| 2011/0174547 A1 | 7/2011 | Sexton et al. |
| 2011/0203791 A1 | 8/2011 | Jin et al. |
| 2011/0220415 A1 | 9/2011 | Jin et al. |
| 2011/0297454 A1 | 12/2011 | Shen et al. |
| 2012/0037425 A1 | 2/2012 | Sexton et al. |
| 2012/0057814 A1 | 3/2012 | Dadson et al. |
| 2012/0225253 A1 | 9/2012 | DiGiovanni et al. |
| 2012/0281938 A1 | 11/2012 | Peterson et al. |
| 2013/0000442 A1 | 1/2013 | Wiesner et al. |
| 2013/0004106 A1 | 1/2013 | Wenzel |
| 2013/0146367 A1 | 6/2013 | Zhang et al. |
| 2013/0170778 A1 | 7/2013 | Higginbotham et al. |
| 2014/0037232 A1 | 2/2014 | Marchand et al. |
| 2014/0176139 A1 | 6/2014 | Espinosa et al. |
| 2014/0254967 A1 | 9/2014 | Gonzalez |
| 2014/0341487 A1 | 11/2014 | Cooley et al. |
| 2014/0355914 A1 | 12/2014 | Cooley et al. |
| 2015/0027713 A1 | 1/2015 | Penisson |
| 2015/0132539 A1 | 5/2015 | Bailey et al. |
| 2016/0153243 A1 | 6/2016 | Hinz et al. |
| 2016/0312535 A1 | 10/2016 | Ritchie et al. |
| 2017/0030393 A1 | 2/2017 | Phua et al. |
| 2017/0138224 A1 | 5/2017 | Henry et al. |
| 2017/0234071 A1 | 8/2017 | Spatz et al. |
| 2017/0261031 A1 | 9/2017 | Gonzalez et al. |
| 2018/0087134 A1 | 3/2018 | Chang et al. |
| 2018/0209476 A1 | 7/2018 | Gonzalez |
| 2018/0216661 A1 | 8/2018 | Gonzalez |
| 2018/0264614 A1 | 9/2018 | Winkelmann et al. |
| 2018/0320740 A1 | 11/2018 | Hall et al. |
| 2019/0063495 A1 | 2/2019 | Peterson et al. |
| 2019/0136628 A1 | 5/2019 | Savage et al. |
| 2019/0170186 A1 | 6/2019 | Gonzalez et al. |
| 2020/0031586 A1 | 1/2020 | Miess et al. |
| 2020/0032841 A1 | 1/2020 | Miess et al. |
| 2020/0032846 A1 | 1/2020 | Miess et al. |
| 2020/0056659 A1 | 2/2020 | Prevost et al. |
| 2020/0063498 A1 | 2/2020 | Prevost et al. |
| 2020/0063503 A1 | 2/2020 | Reese et al. |
| 2020/0182290 A1 | 6/2020 | Doehring et al. |
| 2020/0325933 A1 | 10/2020 | Prevost et al. |
| 2021/0140277 A1 | 5/2021 | Hall et al. |
| 2021/0148406 A1 | 5/2021 | Hoyle et al. |
| 2021/0198949 A1 | 7/2021 | Haugvaldstad et al. |
| 2021/0207437 A1 | 7/2021 | Raymond |
| 2021/0222734 A1 | 7/2021 | Gonzalez et al. |

FOREIGN PATENT DOCUMENTS

| | | |
|---|---|---|
| WO | 2004001238 A2 | 12/2003 |
| WO | 2006028327 A1 | 3/2006 |
| WO | 2017105883 A1 | 6/2017 |
| WO | 2018041578 A1 | 3/2018 |
| WO | 2018226380 A1 | 12/2018 |
| WO | 2019096851 A1 | 5/2019 |

OTHER PUBLICATIONS

Chen, Y.; Nguyen, T; Zhang, L.C.; Polishing of polycrystalline diamond by the technique of dynamic friction—Part 5: Quantitative analysis of material removal, International Journal of Machine Tools & Manufacture, 2009, pp. 515-520, vol. 49, Elsevier.

Chen, Y.; Zhang, L.C.; Arsecularatne, J.A.; Montross, C.; Polishing of polycrystalline diamond by the technique of dynamic friction, part 1: Prediction of the interface temperature rise, International Journal of Machine Tools & Manufacture, 2006, pp. 580-587, vol. 46, Elsevier.

Chen, Y.; Zhang, L.C.; Arsecularatne, J.A.; Polishing of polycrystalline diamond by the technique of dynamic friction. Part 2: Material removal mechanism, International Journal of Machine Tools & Manufacture, 2007, pp. 1615-1624, vol. 47, Elsevier.

Chen, Y.; Zhang, L.C.; Arsecularatne, J.A.; Zarudi, I., Polishing of polycrystalline diamond by the technique of dynamic friction, part 3: Mechanism exploration through debris analysis, International Journal of Machine Tools & Manufacture, 2007, pp. 2282-2289, vol. 47, Elsevier.

Chen, Y.; Zhang, L.C.; Polishing of polycrystalline diamond by the technique of dynamic friction, part 4: Establishing the polishing map, International Journal of Machine Tools & Manufacture, 2009, pp. 309-314, vol. 49, Elsevier.

Dobrzhinetskaya, Larissa F.; Green, II, Harry W.; Diamond Synthesis from Graphite in the Presence of Water and SiO2: Implications for Diamond Formation in Quartzites from Kazakhstan, International Geology Review, 2007, pp. 389-400, vol. 49.

Element six, The Element Six CVD Diamond Handbook, Accessed on Nov. 1, 2019, 28 pages.

Grossman, David, What the World Needs Now is Superhard Carbon, Popular Mechanics, https://www.popularmechanics.com/science/environment/a28970718/superhard-materials/,Sep. 10, 2019, 7 pages, Hearst Magazine Media, Inc.

Hudson Bearings Air Cargo Ball Transfers brochure, accessed on Jun. 23, 2018, 8 Pages, Columbus, Ohio.

Hudson Bearings Air Cargo Ball Transfers Installation and Maintenance Protocols, accessed on Jun. 23, 2018, pp. 1-5.

(56) References Cited

OTHER PUBLICATIONS

International Search Report and Written Opinion dated Aug. 3, 2020 (issued in PCT Application No. PCT/US20/21549) [11 pages].
International Search Report and Written Opinion dated Aug. 4, 2020 (issued in PCT Application No. PCT/US2020/034437) [10 pages].
International Search Report and Written Opinion dated Jan. 15, 2021 (issued in PCT Application No. PCT/US2020/049382) [18 pages].
International Search Report and Written Opinion dated Oct. 21, 2019 (issued in PCT Application No. PCT/US2019/043746) [14 pages].
International Search Report and Written Opinion dated Oct. 22, 2019 (issued in PCT Application No. PCT/US2019/043744) [11 pages].
International Search Report and Written Opinion dated Oct. 25, 2019 (issued in PCT Application No. PCT/US2019/044682) [20 pages].
International Search Report and Written Opinion dated Oct. 29, 2019 (issued in PCT Application No. PCT/US2019/043741) [15 pages].
International Search Report and Written Opinion dated Sep. 2, 2020 (issued in PCT Application No. PCT/US20/37048) [8 pages].
International Search Report and Written Opinion dated Sep. 8, 2020 (issued in PCT Application No. PCT/US20/35316) [9 pages].
International Search Report and Written Opinion dated Sep. 9, 2019 (issued in PCT Application No. PCT/US2019/043732) [10 pages].
International Search Report and Written Opinion dated Sep. 9, 2020 (issued in PCT Application No. PCT/US20/32196) [13 pages].
Liao, Y.; Marks, L.; In situ single asperity wear at the nanometre scale, International Materials Reviews, 2016, pp. 1-17, Taylor & Francis.
Linear Rolling Bearings ME EN 7960—Precision Machine Design Topic 8, Presentation, Accessed on Jan. 26, 2020, 23 Pages, University of Utah.
Linear-motion Bearing, Wikipedia, https://en.wikipedia.org/w/index.php?title=Linear-motion_bearing&oldid=933640111, Jan. 2, 2020, 4 Pages.
Machinery's Handbook 30th Edition, Copyright Page and Coefficients of Friction Page, 2016, p. 158 (2 Pages total), Industrial Press, Inc., South Norwalk, U.S.A.
Machinery's Handbook, 2016, Industrial Press, Inc., 30th edition, pp. 843 and 1055 (6 pages total).
McCarthy, J. Michael; Cam and Follower Systems, PowerPoint Presentation, Jul. 25, 2009, pp. 1-14, UCIrvine The Henry Samueli School of Engineering.
McGill Cam Follower Bearings brochure, 2005, p. 1-19, Back Page, Brochure MCCF-05, Form #8991 (20 Pages total).
Motion & Control NSK Cam Followers (Stud Type Track Rollers) Roller Followers (Yoke Type Track Rollers) catalog, 1991, Cover Page, pp. 1-18, Back Page, CAT. No. E1421 2004 C-11, Japan.
Product Catalogue, Asahi Diamond Industrial Australia Pty. Ltd., accessed on Jun. 23, 2018, Cover Page, Blank Page, 2 Notes Pages, Table of Contents, pp. 1-49 (54 Pages total).
RBC Aerospace Bearings Rolling Element Bearings catalog, 2008, Cover Page, First Page, pp. 1-149, Back Page (152 Pages total).
RGPBalls Ball Transfer Units catalog, accessed on Jun. 23, 2018, pp. 1-26, 2 Back Pages (28 Pages total).
Sandvik Coromant Hard part turning with CBN catalog, 2012, pp. 1-42, 2 Back Pages (44 Pages total).
Sexton, Timothy N.; Cooley, Craig H.; Diamond Bearing Technology for Deep and Geothermal Drilling, PowerPoint Presentation, 2010, 16 Pages.
SKF Ball transfer units catalog, Dec. 2006, Cover Page, Table of Contents, pp. 1-36, 2 Back Pages (40 Pages total), Publication 940-711.
Sowers, Jason Michael, Examination of the Material Removal Rate in Lapping Polycrystalline Diamond Compacts, A Thesis, Aug. 2011, 2 Cover Pages, pp. iii-xiv, pp. 1-87 (101 Pages total).
Sun, Liling; Wu, Qi; Dai, Daoyang; Zhang, Jun; Qin, Zhicheng; Wang, Wenkui; Non-metallic catalysts for diamond synthesis under high pressure and high temperature, Science in China (Series A), Aug. 1999, pp. 834-841, vol. 42 No. 8, China.
Superhard Material, Wikipedia, https://en.wikipedia.org/wiki/Superhard_material, Retrieved from https://en.wikipedia.org/w/index.php?title=Superhard_material&oldid=928571597, Nov. 30, 2019, 14 pages.
Surface Finish, Wikipedia, https://en.wikipedia.org/wiki/Surface_finish, Retrieved from https://en.wikipedia.org/w/index.php?title=Surface_finish&oldid=919232937, Oct. 2, 2019, 3 pages.
United States Defensive Publication No. T102,901, published Apr. 5, 1983, in U.S. Appl. No. 298,271 [2 Pages].
USSynthetic Bearings and Waukesha Bearings brochure for Diamond Tilting Pad Thrust Bearings, 2015, 2 Pages.
USSynthetic Bearings brochure, accessed on Jun. 23, 2018, 12 Pages, Orem, Utah.
Zeidan, Fouad Y.; Paquette, Donald J., Application of High Speed and High Performance Fluid Film Bearings in Rotating Machinery, 1994, pp. 209-234.
Zhigadlo, N. D., Spontaneous growth of diamond from MnNi solvent-catalyst using opposed anvil-type high-pressure apparatus, accessed on Jun. 28, 2018, pp. 1-12, Laboratory for Solid State Physics, Switzerland.
Zou, Lai; Huang, Yun; Zhou, Ming; Xiao, Guijian; Thermochemical Wear of Single Crystal Diamond Catalyzed by Ferrous Materials at Elevated Temperature, Crystals, 2017, pp. 1-10, vol. 7.

* cited by examiner

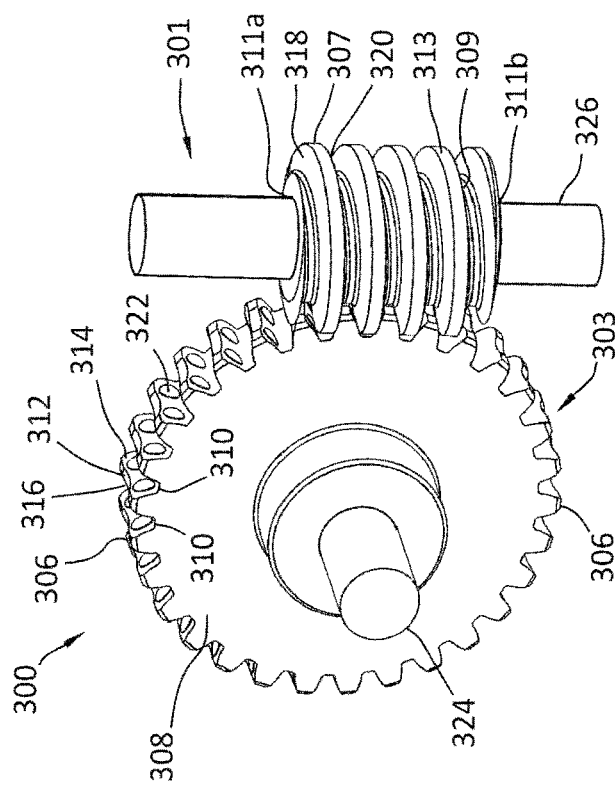
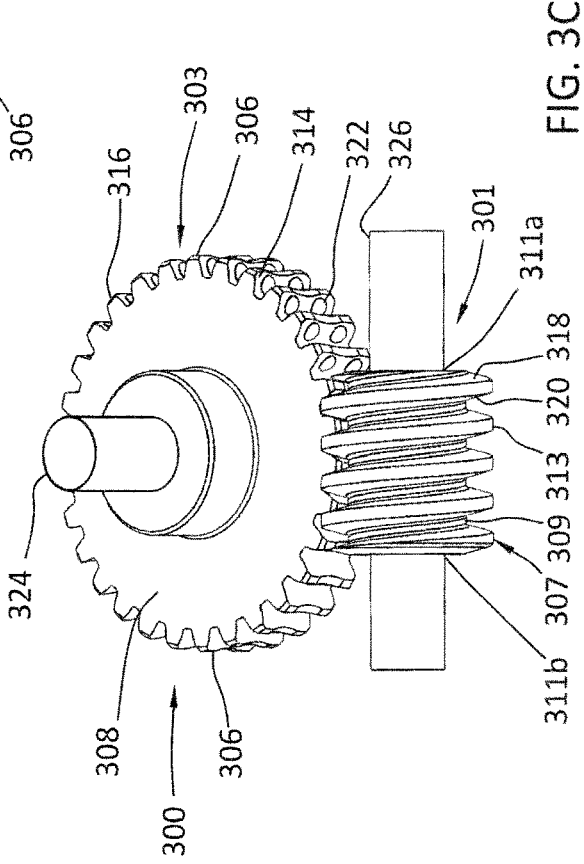
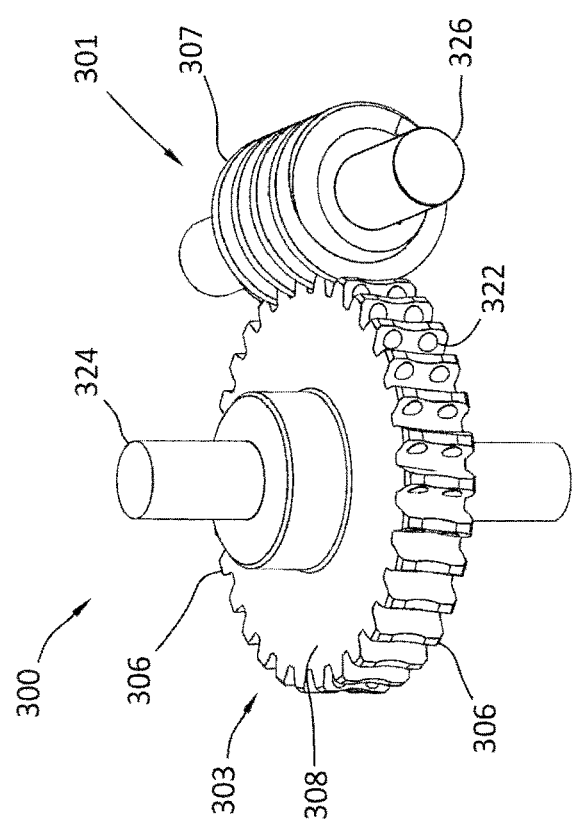

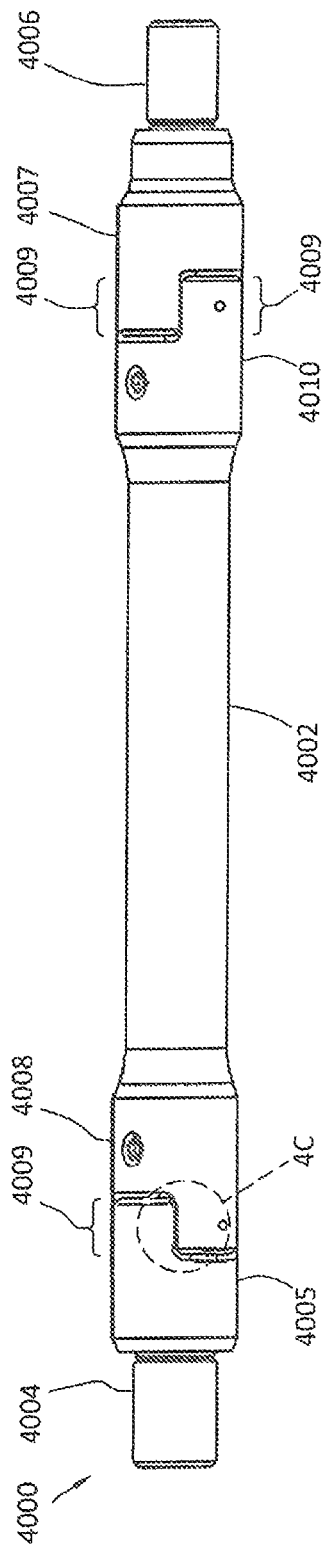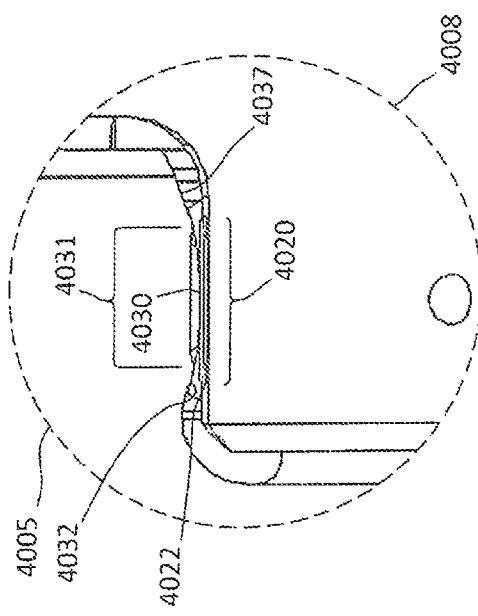

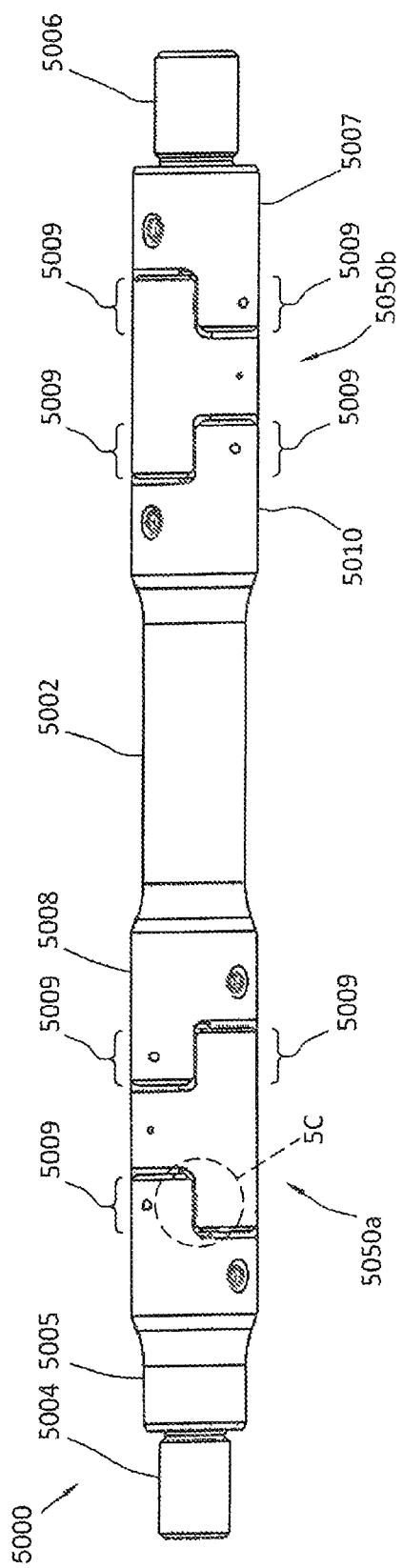
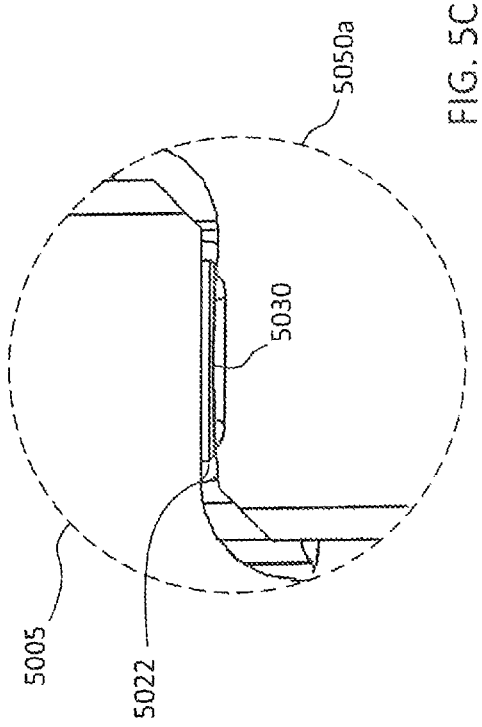
FIG. 5B
FIG. 5C

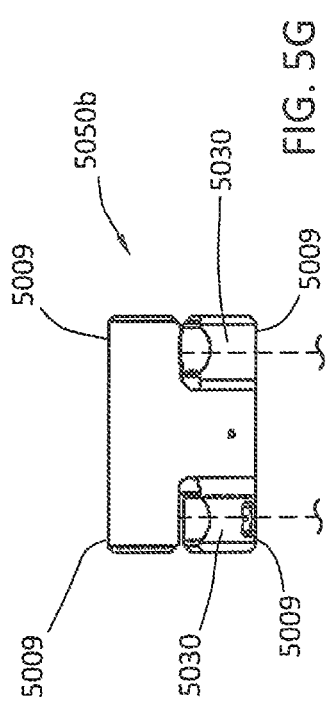
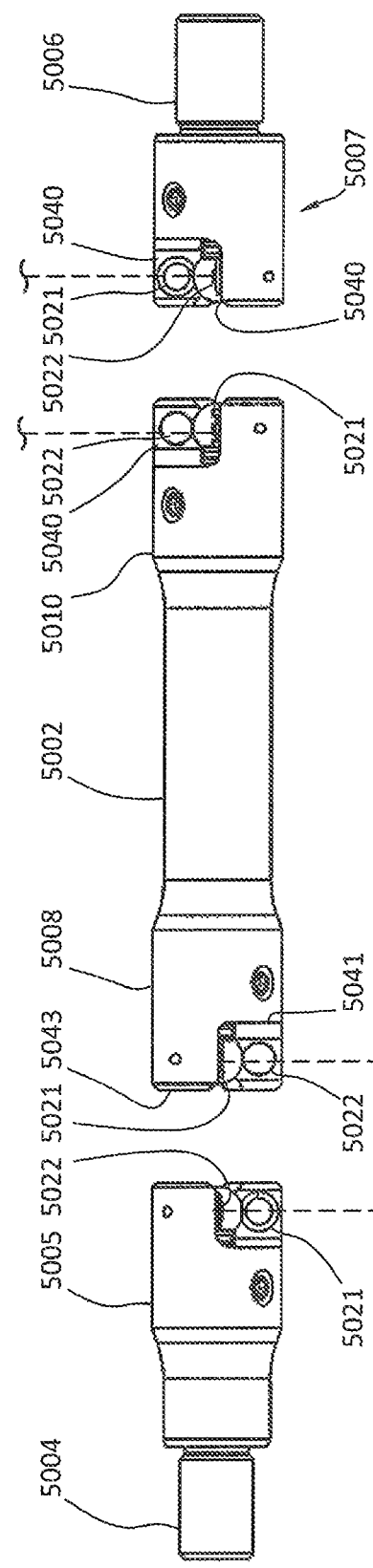
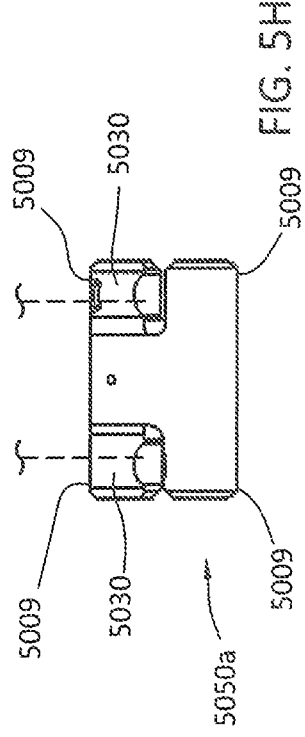

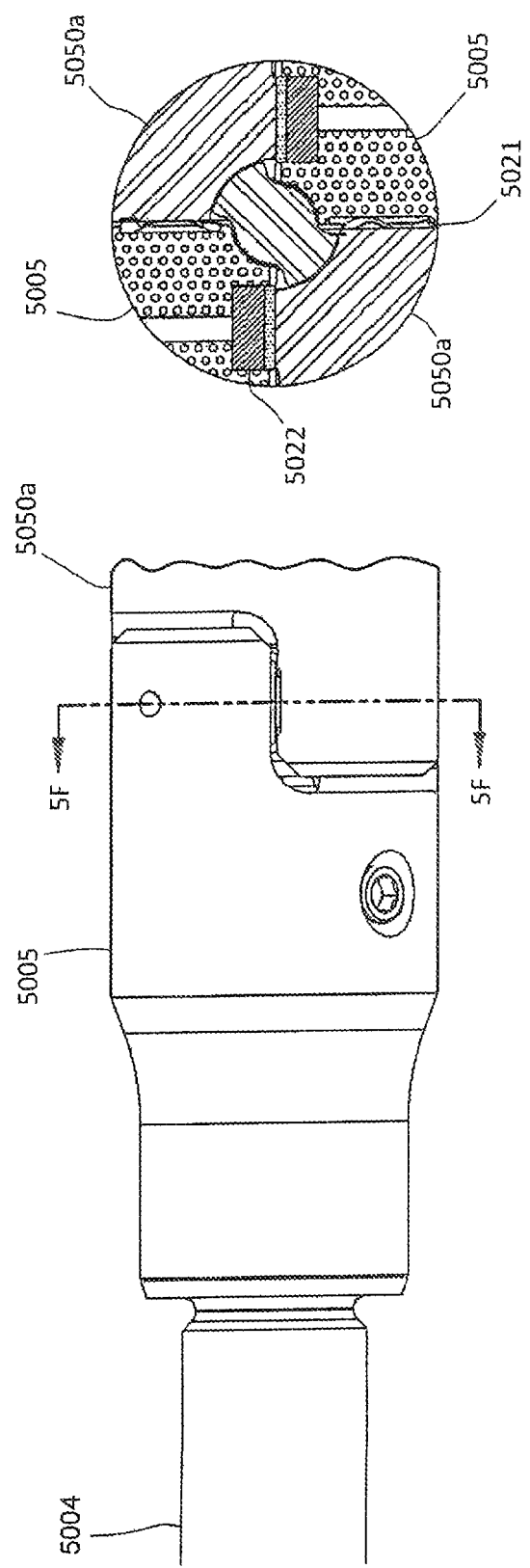

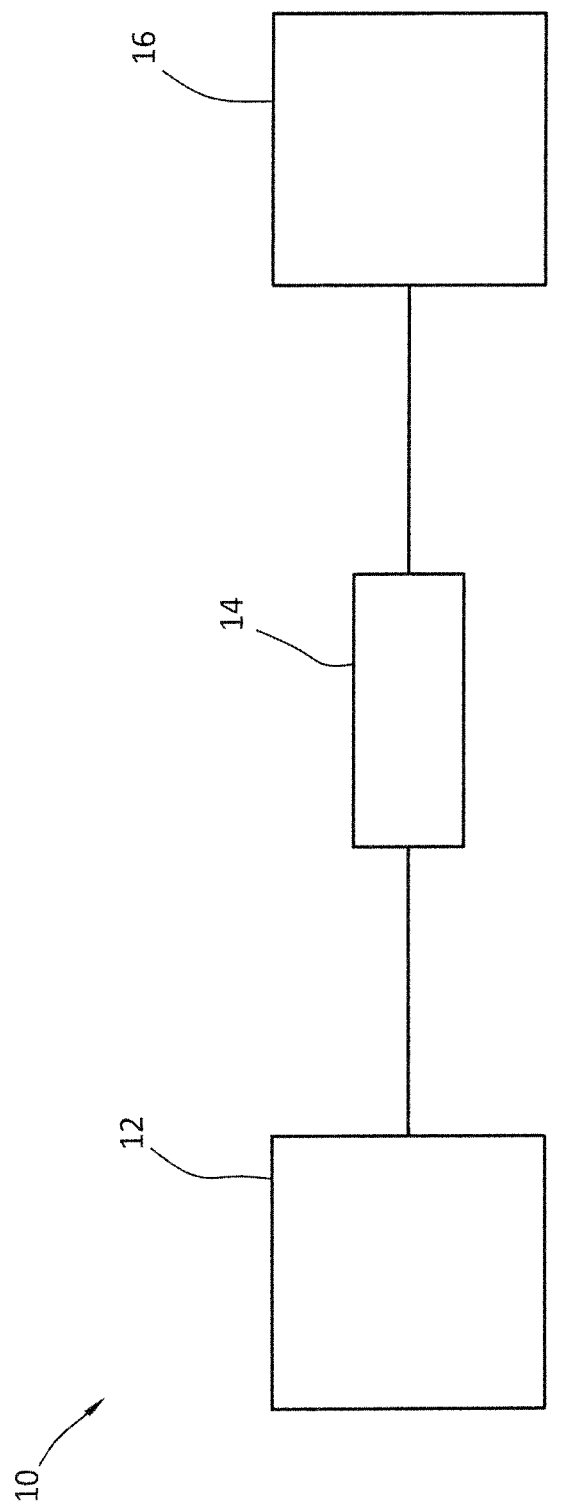

US 11,274,731 B2

POLYCRYSTALLINE DIAMOND POWER TRANSMISSION SURFACES

CROSS-REFERENCE TO RELATED APPLICATIONS

The present application is a Continuation application of U.S. application Ser. No. 16/888,079, filed May 29, 2020 (now allowed), which claims priority to and the benefit, as a Continuation-in-Part of U.S. patent application Ser. No. 16/049,617 entitled "Polycrystalline Diamond Thrust Bearing and Element Thereof", filed on Jul. 30, 2018 (now issued as U.S. Pat. No. 10,760,615), and also claims priority to and the benefit, as a Continuation-in-Part of U.S. patent application Ser. No. 16/425,758, entitled "Material Treatments for Diamond-on-Diamond Reactive Material Bearing Engagements, filed on May 29, 2019 (now allowed), which is itself a Continuation-in-Part of: U.S. patent application Ser. No. 16/049,588, filed on Jul. 30, 2018 (now issued as U.S. Pat. No. 10,465,775); Ser. No. 16/049,608, filed on Jul. 30, 2018 (now issued as U.S. Pat. No. 10,738,821), and Ser. No. 16/049,617, filed on Jul. 30, 2018 (now issued as U.S. Pat. No. 10,760,615); which disclosures are hereby incorporated by reference in their entireties and made a part of the present disclosure for all purposes.

FIELD

The present disclosure relates to polycrystalline diamond for use as a power transmission surface, such as a gear surface; to apparatus and systems including the same; and to methods of making and using the same.

BACKGROUND

Mechanical power transmission systems transmit mechanical energy from one component or system to another component or system, such as to perform work. Mechanical power transmission systems can include a first component (e.g., first gear) coupled with a second component (e.g., second gear), such that when the first component moves at least some of the mechanical energy of the first component is transferred to the second component, causing the second component to correspondingly move. Often such systems include surfaces that are engaged with one another. For example, during movement of a first gear that is meshed with a second gear, at least a portion of the surfaces of the gear teeth of the first gear come into contact with at least a portion of the surfaces of the gear teeth of the second gear. However, mechanical power transmission systems, such as gears, are subject to failures, including material failures resulting from engagement between surfaces. Some exemplary types of gear failures include bending fatigue, contact fatigue, wear, scuffing, overload, and cracking.

When polycrystalline diamond (PCD) elements are used in moving parts, such as rotating machinery, typically both the engagement surface and the opposing engagement surface are composed of polycrystalline diamond. This is, at least in part, because thermally stable polycrystalline diamond (TSP), either supported or unsupported by tungsten carbide, and polycrystalline diamond compact (PDC) have been considered as contraindicated for use in the machining of diamond reactive materials. Diamond reactive materials include metals, metal alloys, composites (e.g., in the form of hardfacings, coatings, or platings) that contain more than trace amounts of diamond catalyst or solvent elements (also referred to as diamond solvent-catalysts or diamond catalyst-solvents) including iron, cobalt, nickel, ruthenium, rhodium, palladium, chromium, manganese, copper, titanium, or tantalum. Further, this prior contraindication of the use of polycrystalline diamond extends to so called "superalloys", including iron-based, cobalt-based and nickel-based superalloys containing more than trace amounts of diamond catalyst or solvent elements. At certain surface speeds in moving parts, load and attendant temperature generated, such as at a cutting tip, often exceeds the graphitization temperature of diamond (i.e., about 700° C.), which can, in the presence of diamond catalyst or solvent elements, lead to rapid wear and failure of components. Without being bound by theory, the specific failure mechanism is believed to result from the chemical interaction of the carbon hearing diamond with the carbon attracting material that is being machined. An exemplary reference concerning the contraindication of polycrystalline diamond for diamond catalyst or solvent containing metal or alloy machining is U.S. Pat. No. 3,745,623. The contraindication of polycrystalline diamond for machining diamond catalyst or diamond solvent containing materials has long caused the avoidance of the use of polycrystalline diamond in all contacting applications with such materials.

BRIEF SUMMARY

Some embodiments of the present disclosure include a power transmission system. The system includes a first component. The first component has at least one power transmission surface thereon. The at least one power transmission surface includes polycrystalline diamond. The system includes a second component. The second component has at least one opposing power transmission surface thereon. The at least one opposing power transmission surface includes a material containing at least 2 weight percent of diamond solvent-catalyst based on a total weight of the material. The first component is movably coupled with the second component such that the polycrystalline diamond is engaged with the diamond solvent-catalyst and such that movement of one of the first and second components drives movement of the other of the first and second components.

Some embodiments of the present disclosure include a method of interfacing engagement between power transmission surfaces of a power transmission system. The method includes positioning polycrystalline diamond on a power transmission surface of a first component. The method includes providing a second component. The second component has an opposing power transmission surface thereon. The opposing power transmission surface includes a material containing at least 2 weight percent of diamond solvent-catalyst based on a total weight of the material. The method includes movably engaging the first component with the second component such that the polycrystalline diamond is engaged with the diamond solvent-catalyst and such that movement of one of the first and second components drives movement of the other of the first and second components.

Some embodiments of the present disclosure include a power transmission system. The system includes a power transmission surface including polycrystalline diamond. The system includes an opposing power transmission surface including a material containing at least 2 weight percent of diamond solvent-catalyst based on a total weight of the material. The power transmission surface is engaged with the opposing power transmission surface such that the polycrystalline diamond is engaged with the diamond solvent-catalyst.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 3A depicts a worm gear meshed with a worm (also referred to as a worm screw), with the worm gear having polycrystalline diamond power transmission surfaces thereon.

FIG. 3B depicts another view of the worm gear meshed with the worm of FIG. 3A.

FIG. 3C depicts another view of the worm gear meshed with the worm of FIG. 3A.

FIG. 4B is an assembled view of the portion of the driveline of FIG. 4A.

FIG. 4C is a detail view of a portion of FIG. 4B.

FIG. 5B is an assembled view of the portion of the driveline of FIG. 5A.

FIG. 5C is a detail view of a portion of FIG. 5B.

FIG. 5D is a disassembled view of the driveline of FIG. 5A.

FIG. 5E is a view of the connection between two components of the double Cardan universal joint of FIG. 5A.

FIG. 5F is a cross-sectional view of a FIG. 5E.

FIG. 5G and FIG. 5H depict disassembled portions of the driveline of FIG. 5D.

FIG. 6 is a schematic of a power transmission system driven by a first component and driving a second component.

Figure 1A:
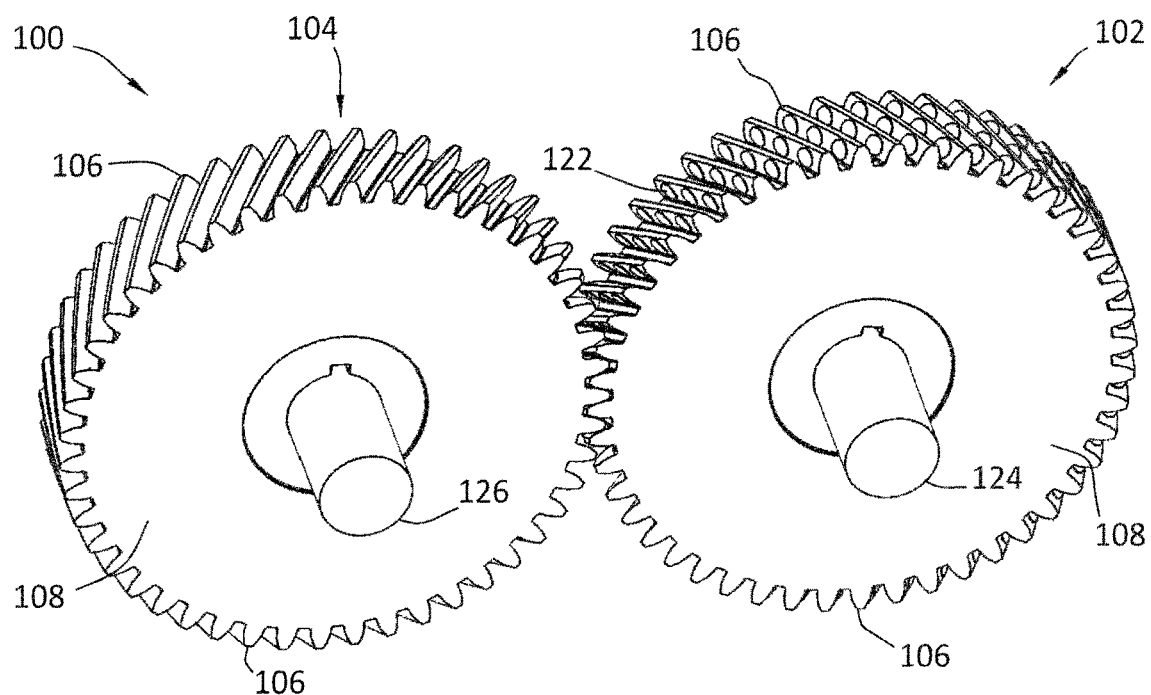
FIG. 1A depicts meshed, helical gears with one of the helical gears having polycrystalline diamond power transmission surfaces thereon.
Figure 1B:
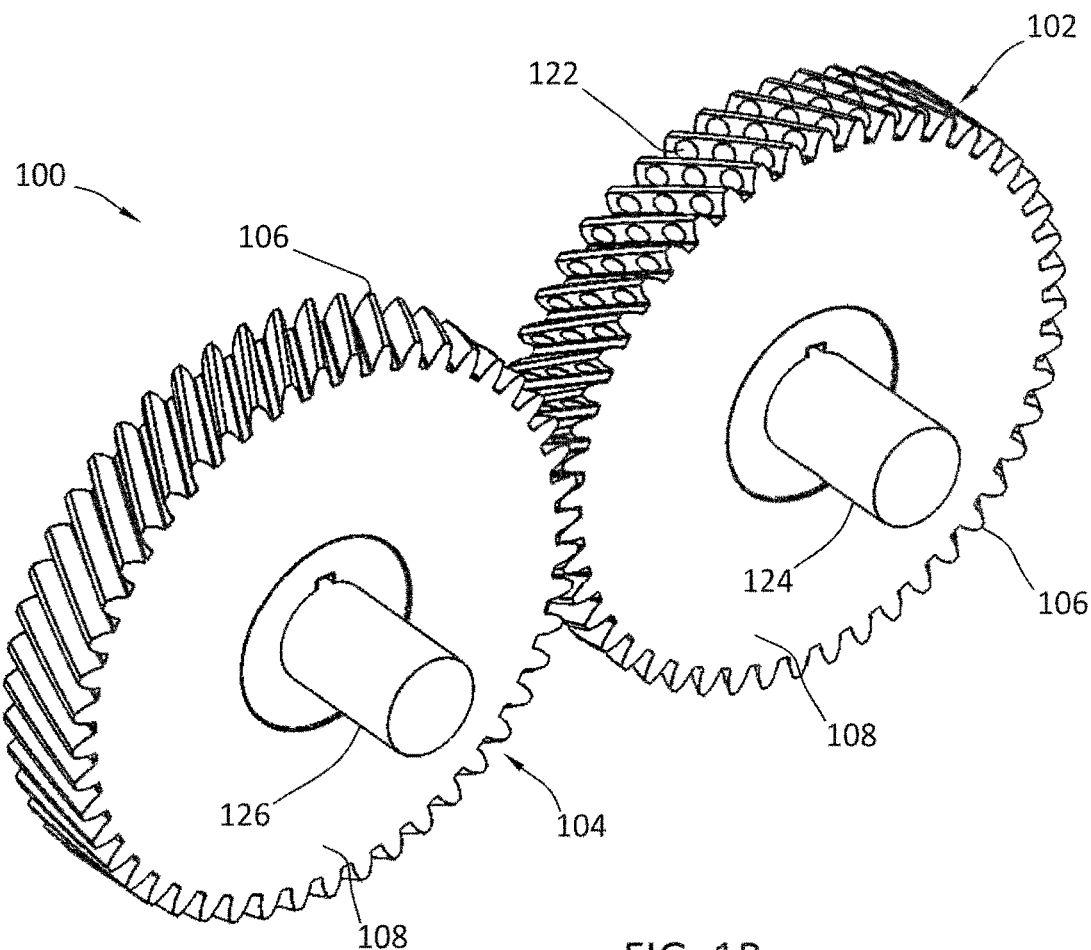
FIG. 1B depicts another view of the meshed, helical gears of FIG. 1A.
Figure 1C:
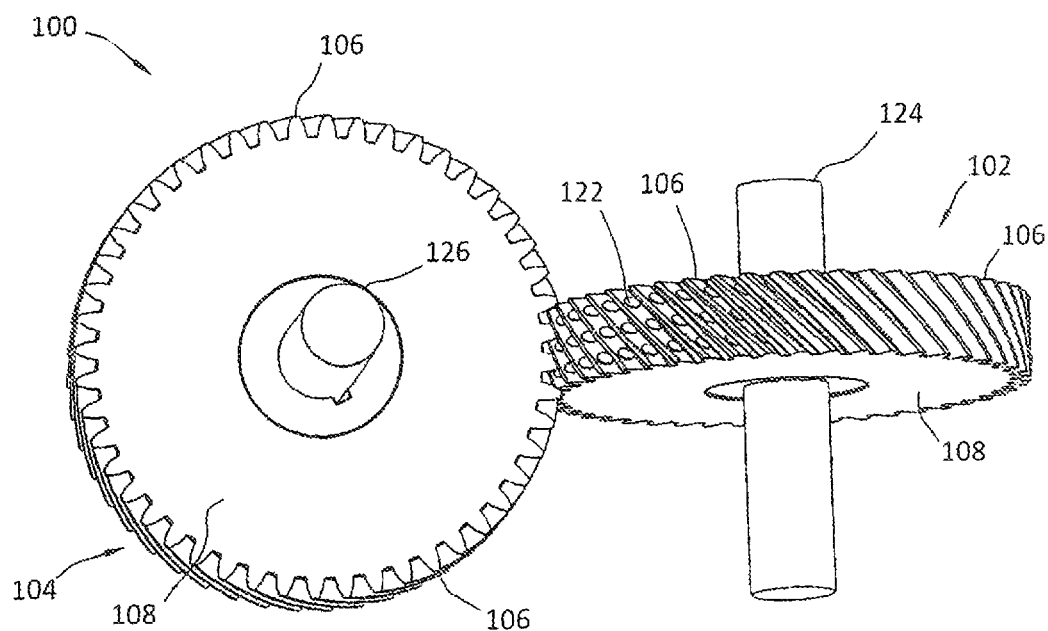
FIG. 1C depicts the meshed, helical gears the same as FIG. 1A, but coupled at a right angle.

Systems, apparatus, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain embodiments of the present disclosure include methods and apparatus for providing power transmission systems with polycrystalline diamond power transmission surfaces. The power transmission systems disclosed herein include, but are not limited to, gears and drivelines. The gears disclosed herein include, but are not limited to, helical gears, spur gears, and worm drives. The drivelines disclosed herein include, but are not limited to, mechanical couplings, including flexible mechanical couplings, between moving parts. The drivelines disclosed herein may include shaft couplings. In one exemplary embodiment, the drivelines disclosed herein include universal joints (e.g., single universal joints or single Cardan universal joints or double Cardan universal joints). The power transmission systems disclosed herein may be a component of a larger system, such as a drilling motor or a portion of a drivetrain. The power transmission systems disclosed herein are not limited to the particular applications discussed herein, and may be incorporated into other machinery that includes gears, drivelines, or other power transmission systems that include power transmission surfaces. Power transmission surfaces are surfaces of components within a power transmission system that engage one another for the transfer of mechanical energy (e.g., via the transfer of torque) between the components. For example, in a power transmission system that includes two gears that are meshed together, the power transmission surfaces include the gear tooth surfaces of the meshed gears that are or come into contact with one another during movement of the gears. Within this disclosure, when referring to engaged power transmission surfaces (e.g., meshed gear teeth), one power transmission surface may be referred to as a "power transmission surface" while the other may be referred to as an "opposing power transmission surface."

The present disclosure includes engaged power transmission surfaces where one of the power transmission surfaces includes a polycrystalline diamond and the other, opposing power transmission surface does not include a polycrystalline diamond. As described in more detail below, in some embodiments a first power transmission surface includes a polycrystalline diamond, and a second, opposing power transmission surface includes diamond solvent-catalyst. In some embodiments, the opposing power transmission surface is a treated surface in accordance with U.S. patent application Ser. No. 16/425,758. For example, the opposing power transmission surface (also referred to as the opposing engagement surface) may be hardened, such as via cold working and work hardening processes including burnishing and shot peening; and/or heat-treating processes including through hardening, case hardening, and subzero, cryogenic, deep freezing treatments. Also, the opposing power transmission surface may be plated and/or coated, such as via electroplating, electroless plating, including chromium plating, phosphating, vapor deposition, including physical vapor deposition (PVD) and chemical vapor deposition (CVD), or anodizing. Also, the opposing power transmission surface may be cladded, such as via roll bonding, laser cladding, or explosive welding.

In some embodiments, the power transmission surfaces disclosed herein are a portion of a motor, such as a drilling motor for downhole drilling, including directional drilling, such as a mud motor. The power transmission surfaces disclosed herein may be a surface of a gear (e.g., of a gearbox). While described in reference to downhole drilling applications, the power transmission surfaces disclosed herein may also be used in other applications. In some embodiments, the power transmission surfaces disclosed herein are a portion of a turbine, pump, compressor, mining equipment, construction equipment, combustion engine, windmill, automotive part, aircraft part, marine equipment, transmissions, rail cars, hard drives, centrifuges, medical equipment, robotics, machine tools, amusement rides, amusement devices, brakes, clutches, motors, or other assemblies that include power transmission systems.

Definitions, Examples, and Standards

Diamond Reactive Materials—As used herein, a "diamond reactive material" is a material that contains more than trace amounts of diamond catalyst or diamond solvent, which are also referred to as "diamond catalyst-solvent," "catalyst-solvent," "diamond solvent-catalyst," or "solvent-catalyst." Some examples of known solvent-catalysts are disclosed in: U.S. Pat. Nos. 6,655,845; 3,745,623; 7,198,043; 8,627,904, 5,385,715; 8,485,284; 6,814,775; 5,271,749; 5,948,541; 4,906,528; 7,737,377; 5,011,515; 3,650,714, 2,947,609; and 8,764,295. As used herein, a diamond reactive material that contains more than "trace amounts" of diamond catalyst or diamond solvent, is a material that contains at least 2 percent by weight (wt. %) diamond catalyst or diamond solvent based on a total weight of the diamond reactive material. In some aspects, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond catalyst or diamond solvent based on a total weight of the diamond reactive material. As would be understood by one skilled in the art, diamond solvent-catalysts are chemical elements, compounds, or materials (e.g., metals) that are capable of reacting with polycrystalline diamond (e.g., catalyzing and/or solubilizing), resulting in the graphitization of the polycrystalline diamond, such as under load and at a temperature at or exceeding the graphitization temperature of diamond (i.e., about 700° C.). Thus, diamond reactive materials include materials that, under load and at a temperature at or exceeding the graphitization temperature of diamond, can lead to wear, sometimes rapid wear, and failure of components formed of or including polycrystalline diamond, such as diamond tipped tools. Diamond reactive materials include, but are not limited to, metals, metal alloys, and composite materials that contain more than trace amounts of diamond solvent-catalysts. In some aspects, the diamond reactive materials are in the form of hardfacings, coatings, or platings. Some exemplary diamond solvent-catalysts include iron, cobalt, nickel, ruthenium, rhodium, palladium, chromium, manganese, copper, titanium, tantalum, and alloys thereof. Thus, a diamond reactive material may be a material that includes more than trace amounts of iron, cobalt, nickel, ruthenium, rhodium, palladium, chromium, manganese, copper, titanium, tantalum, or alloys thereof. One exemplary diamond reactive material is steel. In some aspects, the diamond reactive material is a superalloy including, but not limited to, an iron-based superalloy, a cobalt-based superalloy, or a nickel-based superalloy. In certain aspects, the diamond reactive material is not and/or does not include (i.e., specifically excludes) so called "superhard materials." As would be understood by one skilled in the art, "superhard materials" are a category of materials defined by the hardness of the material, which may be determined in accordance with the Brinell, Rockwell, Knoop and/or Vickers scales. For example, superhard materials include materials with a hardness value exceeding 40 gigapascals (GPa) when measured by the Vickers hardness test. As used herein, "superhard materials" are materials that are at least as hard as tungsten carbide, including tungsten carbide tiles and cemented tungsten carbide, such as is determined in accordance with one of these hardness scales. One skilled in the art would understand that a Brinell scale test may be performed, for example, in accordance with ASTM E10-18; the Vickers hardness test may be performed, for example, in accordance with ASTM E92-17; the Rockwell hardness test may be performed, for example, in accordance with ASTM E18; and the Knoop hardness test may be performed, for example, in accordance with ASTM E384-17. The "superhard materials" disclosed herein include, but are not limited to, tile tungsten carbide, cemented tungsten carbide, infiltrated tungsten carbide matrix, silicon carbide, silicon nitride, cubic boron nitride, and polycrystalline diamond. Thus, in some aspects, the "diamond reactive material" is partially or entirely composed of material(s) (e.g., metal, metal alloy, composite) that is softer (less hard) than superhard materials, such as less hard than tungsten carbide (e.g., tile or cemented), as determined in accordance with one of these hardness tests, such as the Brinell scale.

Interfacing Polycrystalline Diamond with Diamond Reactive Materials—In some embodiments, the present disclosure provides for interfacing the contact between a first power transmission surface that includes a polycrystalline diamond surface and a second power transmission surface that includes a diamond solvent-catalyst surface. For example, the polycrystalline diamond surface may be positioned and arranged on or as the first power transmission surface for sliding and/or rolling contact with the diamond solvent-catalyst surface. As used herein, "engagement surface" refers to the surface of a material or component (e.g., polycrystalline diamond or diamond reactive materials) that is positioned and arranged within a power transmission system such that, in operation of the power transmission system (e.g., a gearbox), the engagement surface interfaces the contact between two components (e.g., between two gears in a gearbox). In some embodiments, the power transmission surface disclosed herein is in direct contact with an opposing power transmission surface (i.e., boundary lubrication), without a fluid film therebetween. In some embodiments, a fluid film may develop (i.e., hydrodynamic lubrication) between the power transmission surface and the opposing power transmission surface such that the surfaces are not directly in contact with one another, but are engaged through the fluid film. In some aspects, the contact between the power transmission surface and opposing power transmission surface is between (or a mixture of) direct contact and fluid film (i.e., mixed boundary lubrication).

Lapped or Polished—In certain applications, the polycrystalline diamond, or at least the engagement surface thereof, is lapped or polished, optionally highly lapped or highly polished. Although highly polished polycrystalline diamond is used in at least some applications, the scope of this disclosure is not limited to highly polished polycrystalline diamond and includes polycrystalline diamond that is highly lapped or polished. As used herein, a surface is defined as "highly lapped" if the surface has a surface finish of 20 μin or about 20 μin, such as a surface finish ranging from about 18 to about 22 μin. As used herein, a surface is defined as "polished" if the surface has a surface finish of less than about 10 μin, or of from about 2 to about 10 μin. As used herein, a surface is defined as "highly polished" if the surface has a surface finish of less than about 2 μin, or from about 0.5 μin to less than about 2 μin. In some aspects, the polycrystalline diamond engagement surfaces disclosed herein have a surface finish ranging from 0.5 μin to 40 μin, or from 2 μin to 30 μin, or from 5 μin to 20 μin, or from 8 μin to 15 μin, or less than 20 μin, or less than 10 μin, or less than 2 μin, or any range therebetween. Without being bound by theory, it is believed that polycrystalline diamond that has been polished to a surface finish of 0.5 μin has a coefficient of friction that is about half of standard lapped polycrystalline diamond with a surface finish of 20-40 μin. U.S. Pat. Nos. 5,447,208 and 5,653,300 to Lund et al., the entireties of which are incorporated herein by reference, provide disclosure relevant to polishing of polycrystalline diamond. As would be understood by one skilled in the art, surface finish, also referred to as surface texture or surface topography, is a characteristic of a surface as defined by lay, surface roughness, and waviness. Surface finish may be determined in accordance with ASME B46.1-2009. Surface finish may be measured with a profilometer, laser microscope, or with Atomic Force Microscopy, for example. In some embodiments, the opposing engaging surface has a surface finish of from 0.5 to 2,000 μin, or from 1 to 1,900 μin, or from 5 to 1,500 μin, or from 10 to 1,200 μin, or from 50 to 1,000 μin, or from 100 to 800 μin, or from 200 to 600 μin. In some embodiments, the opposing engagement surface has a surface finish that is greater than the engagement surface (i.e., rougher).

Gears with Polycrystalline Diamond Power Transmission Surfaces

Some embodiments of the present disclosure include power transmission systems that include meshed gears or cogwheels. In one exemplary embodiment, the meshed gears are helical gears.

Figure 1D:
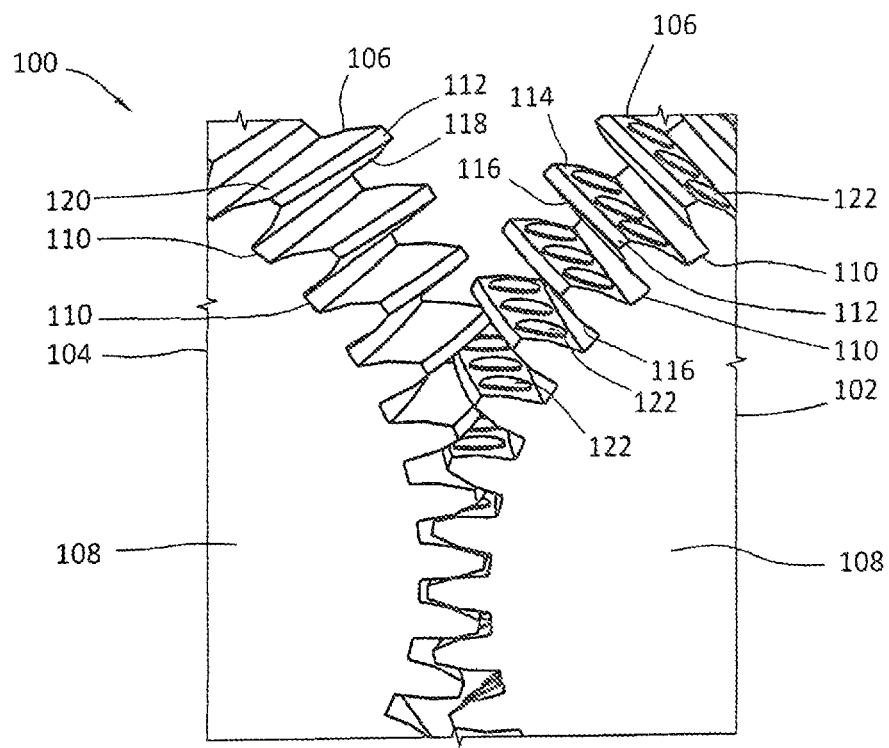
FIG. 1D depicts a detail view of meshed, helical gears of FIG. 1A.

With reference to FIGS. 1A-1D, pairs of meshed helical gears are depicted. Meshed gears 100 may be a portion of a power transmission system. Meshed gears 100 include first gear 102 and second gear 104, each of which is a helical gear. First gear 102 and second gear 104 are meshed together such that, in operation, mechanical power is transferred from one of first gear 102 and second gear 104 to the other of first gear 102 and second gear 104. Each of first gear 102 and second gear 104 includes a plurality of teeth 106 protruding from a gear body 108 and extending about the outer circumference thereof. As shown in FIG. 1D, each gear tooth 106 extends from gear body 108 between two adjacent root surfaces 110, and includes a gear top land 112. Each gear tooth 106 of first gear 102 includes a first gear tooth surface 114 extending from one adjacent root surface 110 to the gear top land 112 thereof, and a second ear tooth surface 116 extending from another adjacent root surface 110 to the gear top land 112 thereof. Each gear tooth 106 of second gear 104 includes a first gear tooth surface 118 extending from one adjacent root surface 110 to the gear top land 112 thereof, and a second gear tooth surface 120 extending from another adjacent root surface 110 to the gear top land 112 thereof. First gear tooth surface 114 of first gear 102 includes polycrystalline diamond surfaces 122 thereon. While shown as including three discrete polycrystalline diamond surfaces 122 on each first gear tooth surface 114, the present disclosure is not limited to including this arrangement, and may include more or less than three discrete polycrystalline diamond surfaces. In some embodiments, the entirety of first gear tooth surface 114 is polycrystalline diamond. In other embodiments, less than an entirety of first gear tooth surface 114 is polycrystalline diamond. First gear 102 and second gear 104 are meshed such that polycrystalline diamond surfaces 122 of first gear 102 engage with first gear tooth surface 118 of second gear 104. Second gear tooth surface 118 includes diamond solvent-catalyst. For example, second gear tooth surface 118 may be a steel surface. In some embodiments, both of first gear and second gear are or include a diamond solvent-catalyst, with the provision that at least one of the first and second gears has polycrystalline diamond elements coupled therewith to provide power transmission surfaces thereon. While polycrystalline diamond surfaces 122 are shown only on one of the gear tooth surfaces of meshed gears 100 (i.e., on first gear tooth surface 114), the present disclosure is not limited to such an arrangement. For example, in some embodiments, second gear tooth surface 116 of first gear 102 may also include polycrystalline diamond surfaces thereon for engagement with second gear tooth surface 120 of second gear 104 that includes diamond solvent-catalyst. In other embodiments, second gear tooth surface 120 may include polycrystalline diamond surfaces for engagement with second gear tooth surface 116 of first gear 102. For example, in one embodiment both of surfaces 114 and 116 are or include polycrystalline diamond surfaces, while both of surfaces 118 and 120 are or include diamond solvent-catalyst, such that, regardless of whether the meshed gears 100 rotate clockwise or counterclockwise, the polycrystalline diamond surfaces are engaging with the diamond solvent-catalyst surfaces. In another embodiment, surfaces 114 and 120 are or include polycrystalline diamond surfaces, while surfaces 116 and 118 are or include diamond solvent-catalyst, such that, regardless of whether the meshed gears 100 rotate clockwise or counterclockwise, the polycrystalline diamond surfaces are engaging with the diamond solvent-catalyst surfaces.

First gear 102 is coupled with gear axle 124, and second gear 104 is coupled with gear axle 126. In one exemplary operation, rotation of gear axle 124 causes first gear 102 to rotate, rotation of first gear 102 causes second gear 104 to rotate, and rotation of second gear 104 causes gear axle 126 to rotate. First gear 102 and second gear 104 may be coupled with a first component at a drive end thereof and with a second component at a driven end thereof. Some exemplary components that may be coupled with the first and second gears 102,104 at the drive end include, but are not limited to, an electric motor, an internal combustion engine, a gas turbine engine, a wind turbine, a water turbine, a steam turbine, a hydraulic motor, and a drilling motor turbine. The component at the drive end rotates the first gear. For example, the component at the drive end may be coupled with gear axle 124, and may drive rotation of gear axle 124, which drives rotation of first gear 102, which drives rotation of second gear 104, which drives rotation of gear axle 126. At the driven end, gear axle 126 may be coupled with a component that is driven by first and second gears 102,104. Some exemplary driven end components include, but are not limited to, a pump, generator, driveline, machine tool spindle or chuck, wench, drill bit, power take off unit, propeller shaft, axle shaft, or other mechanical equipment that performs work. One skilled in the art would understand that numerous and various components may be driven by the gear assemblies disclosed herein. During rotation of first gear 102, gear teeth 106 of first gear 102 engage between gear teeth 106 of second gear 104, such that first gear teeth surfaces 114 with polycrystalline diamond surfaces 122 engage (e.g., in sliding and/or rolling contact) with first gear teeth surfaces 118 of second gear 104. As such, during rotation of meshed gears 100, the polycrystalline diamond surfaces 122 engage, in sliding and/or rolling contact, with the diamond solvent-catalyst of first gear teeth surfaces 118. The power transmissions surfaces disclosed herein are not limited to being in sliding or rolling contact, and may be movingly engaged in other manners where the engagement surface and opposing engagement surface are in contact and apply pressure to one another.

Figure 2A:
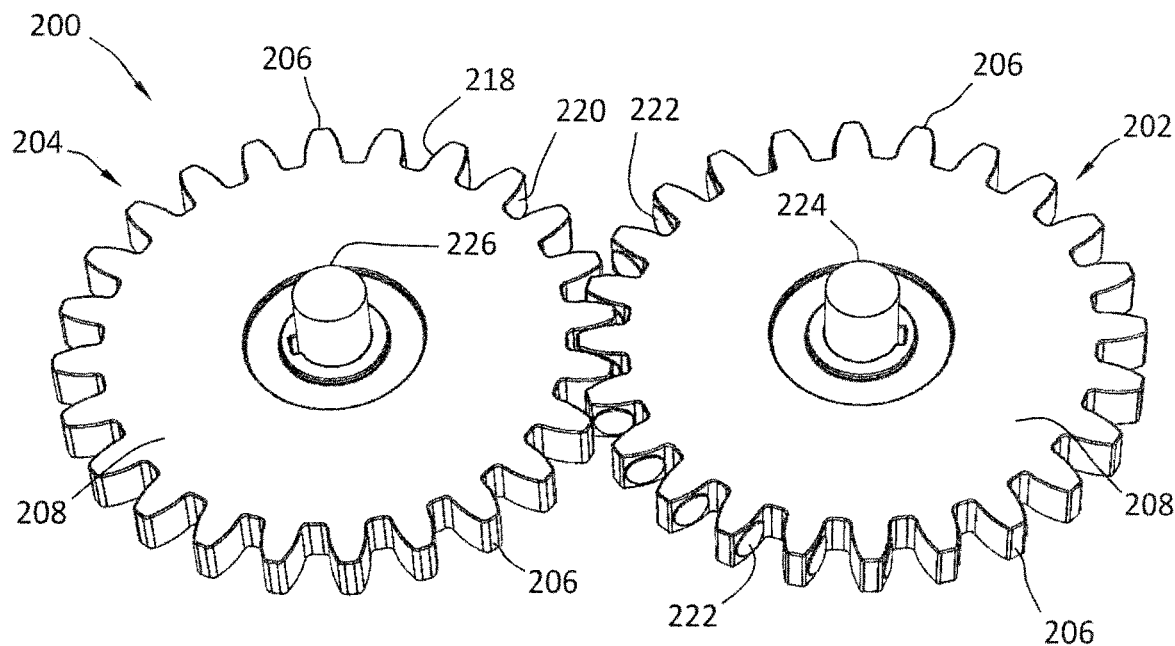
FIG. 2A depicts meshed, spur gears with one of the spur gears having polycrystalline diamond power transmission surfaces thereon.
Figure 2B:
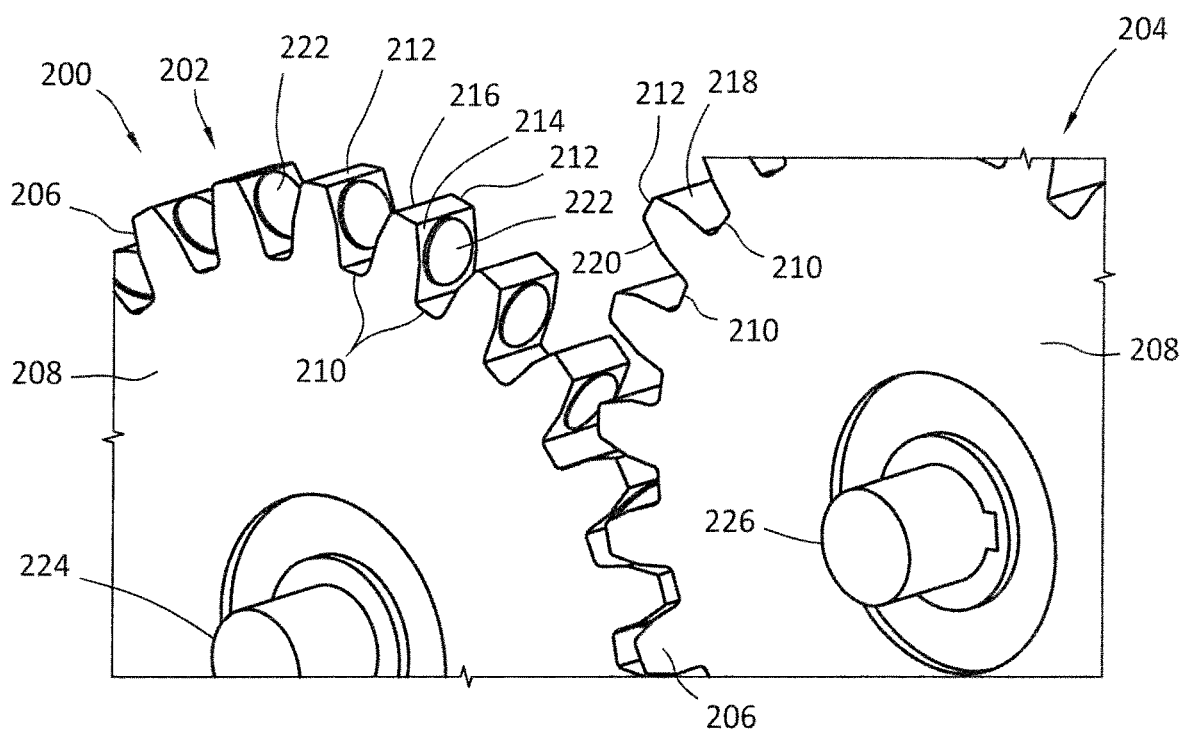
FIG. 2B depicts a detail view of the meshed, spur gears of FIG. 2A.

In one exemplary embodiment, the power transmission systems disclosed herein include meshed spur gears that include power transmission surfaces. With reference to FIGS. 2A and 2B, meshed spur gears 200 include first gear 202 and second gear 204, each of which is a spur gear. First gear 202 and second gear 204 are meshed together such that, in operation, mechanical power is transferred from one of first gear 202 and second gear 204 to the other of first gear 202 and second gear 204. Each of first gear 202 and second gear 204 includes a plurality of teeth 206 protruding from a gear body 208. As shown in FIG. 2B, each gear tooth 206 extends from gear body 208 between two adjacent root surfaces 210, and includes a gear top land 212. Each gear tooth 206 of first gear 202 includes a first gear tooth surface 214 extending from one adjacent root surface 210 to the gear top land 212 thereof, and a second gear tooth surface 216 extending from another adjacent root surface 210 to the gear top land 212 thereof. Each gear tooth 206 of second gear 204 includes a first gear tooth surface 218 extending from one adjacent root surface 210 to the gear top land 212 thereof, and a second gear tooth surface 220 extending from another adjacent root surface 210 to the gear top land 212 thereof. First gear tooth surface 214 of first gear 202 includes polycrystalline diamond surfaces 222 thereon. While shown as including one discrete polycrystalline diamond surface 222 on each first gear tooth surface 214, the present disclosure is not limited to including this arrangement, and may include more than one discrete polycrystalline diamond surfaces. In some embodiments, the entirety of first gear tooth surface 214 is polycrystalline diamond. In other embodiments, less than an entirety of first gear tooth surface 214 is polycrystalline diamond. First gear 202 and second gear 204 are meshed such that first gear tooth surface 214 of first gear 202 engages with first gear tooth surface 218 of second gear 204. Second gear tooth surface 218 includes diamond solvent-catalyst. While polycrystalline diamond surfaces 222 are shown only on one of the gear tooth surfaces of meshed gears 200 (i.e., on first gear tooth surface 214), the present disclosure is not limited to such an arrangement. For example, in some embodiments, second gear tooth surface 216 of first gear 202 may also include polycrystalline diamond surfaces thereon for engagement with second gear tooth surface 220 of second gear 204 that includes diamond solvent-catalyst. In other embodiments, second gear tooth surface 220 may include polycrystalline diamond surfaces for engagement with second gear tooth surface 216 of first gear 202. For example, in one embodiment both of surfaces 214 and 216 are or include polycrystalline diamond surfaces, while both of surfaces 218 and 220 are or include diamond solvent-catalyst, such that, regardless of whether the meshed gears 200 rotate clockwise or counterclockwise, the polycrystalline diamond surfaces are engaging with the diamond solvent-catalyst surfaces. In another embodiment, surfaces 214 and 220 are or include polycrystalline diamond surfaces, while suffices 216 and 218 are or include diamond solvent-catalyst, such that, regardless of whether the meshed gears 200 rotate clockwise or counterclockwise, the polycrystalline diamond surfaces are engaging with the diamond solvent-catalyst surfaces. First gear 202 is coupled with gear axle 224, and second gear 204 is coupled with gear axle 226. In one exemplary operation, rotation of gear axle 224 causes first gear 202 to rotate, rotation of first gear 202 causes second gear 204 to rotate, and rotation of second gear 204 causes gear axle 226 to rotate. During rotation of first gear 202, gear teeth 206 of first gear 202 engage between gear teeth 206 of second gear 204, such that first gear teeth surfaces 214 with polycrystalline diamond surfaces 222 engage (e.g., in sliding and/or rolling contact) with first gear teeth surfaces 218 of second gear 204. As such, during rotation of meshed gears 200, the polycrystalline diamond surfaces 222 engage, in sliding and/or rolling contact, with the diamond solvent-catalyst of first gear teeth surfaces 218.

In one exemplary embodiment, the power transmission systems disclosed herein include a worm drive, including a worm meshed with a worm gear, with the worm and worm gear including power transmission surfaces. With reference to FIGS. 3A-3C, worm drive 300 includes worm 301 and worm gear 303. Worm gear 303 may be the same or substantially similar to a spur gear. Worm 301 may be similar to a screw. Worm 301 is meshed with worm gear 303 such that, in operation, mechanical power is transferred from one of worm 301 and worm gear 303 to the other of worm 301 and worm gear 303. Worm 301 includes gear tooth 307 that extends about a full rotation of worm 301. Gear tooth 307 is similar to screw threading, extending helically about axle 326 of worm 301 from position 311a to position 311b. Gear tooth 307 extends from root surface 309, and includes gear top land 313. Gear tooth 307 includes first gear tooth surface 318 and second gear surface 320. Worm gear 303 includes a plurality of teeth 306 protruding from a gear body 308. As shown in FIG. 3B, each gear tooth 306 extends from gear body 308 between two adjacent root surfaces 310, and includes a gear top land 312. Each gear tooth 306 of worm gear 303 includes a first gear tooth surface 314 extending from one adjacent root surface 310 to the gear top land 312 thereof, and a second gear tooth surface 316 extending from another adjacent root surface 310 to the gear top land 312 thereof. First gear tooth surface 314 of worm gear 303 includes polycrystalline diamond surfaces 322 thereon. While shown as including two discrete polycrystalline diamond surfaces 322 on each first gear tooth surface 314, the present disclosure is not limited to including this arrangement, and may include inure or less than two discrete polycrystalline diamond surfaces. In some embodiments, the entirety of first gear tooth surface 314 is polycrystalline diamond. In other embodiments, less than an entirety of first gear tooth surface 314 is polycrystalline diamond. Worm 301 and worm gear 303 are meshed such that first gear tooth surface 314 of worm gear 303 engages with first gear tooth surface 318 of worm 301. Second gear tooth surface 318 includes diamond solvent-catalyst (e.g., steel). While polycrystalline diamond surfaces 322 are shown only on one of the gear tooth surfaces of meshed gears 300, the present disclosure is not limited to such an arrangement. For example, in some embodiments, second gear tooth surface 316 of worm gear 303 may also include polycrystalline diamond surfaces thereon for engagement with second gear tooth surface 320 of worm 301 that includes diamond solvent-catalyst. In other embodiments, second gear tooth surface 320 may include polycrystalline diamond surfaces for engagement with second gear tooth surface 316 of worm wheel 303. In such embodiments, regardless of whether the worm drive 300 rotates clockwise or counterclockwise, the polycrystalline diamond surfaces are engaging with the diamond solvent-catalyst surfaces. Worm gear 303 is coupled with gear axle 324, and worm 301 is coupled with gear axle 326. In one exemplary operation, rotation of gear axle 326 causes worm 301 to rotate, rotation of worm 301 causes worm gear 303 to rotate, and rotation of worm gear 303 causes gear axle 324 to rotate. During rotation of meshed gears 300, gear teeth 306 of worm gear 303 engage between surfaces 318 and 320 of gear tooth 307 of worm 301, such that first gear teeth surfaces 314 with polycrystalline diamond surfaces 322 engage (e.g., in sliding and/or rolling contact) with first gear teeth surface 318 of worm 301. As such, during rotation of meshed gears 300, the polycrystalline diamond surfaces 322 engage, in sliding and/or rolling contact, with the diamond solvent-catalyst of first gear teeth surfaces 318.

While the gears shown and described in FIGS. 1A-3C include particular embodiments of helical gears, spur gears, and worm drives, the present disclosure is not limited to these particular embodiments, and the disclosed power transmission surfaces with polycrystalline diamond may be incorporated into other gears. For example, and without limitation, the power transmission surfaces with polycrystalline diamond may be incorporated into spur gears, helical gears, skew gears, double helical gears, bevel gears, spiral bevel gears, hypoid gears, crown gears, worm drives, non-circular gears, rack and pinion gears, epicyclic gears, sun and planet gears, harmonic gears, cage gears, and cycloidal gears. Also, while shown herein as gears having cut teeth, the power transmission surfaces with polycrystalline diamond may be incorporated into cogwheels having inserted teeth. Further, while the gears shown herein are external gears with teeth on the outer surface, the power transmission surfaces with polycrystalline diamond may be incorporated into internal gears with teeth on the inner surface.

Mechanical Couplings with Polycrystalline Diamond Power Transmission Surfaces

Some embodiments of the present disclosure include power transmission systems that include mechanical couplings, including flexible mechanical couplings. Some exemplary mechanical couplings include, but are not limited to, jaw couplings, claw couplings, and knuckle joints. In some embodiments, the mechanical couplings disclosed herein include universal joints, which are sometimes referred to as universal couplings, U-joints, Cardan joints, Spicer joints, Hardy Spicer joints, and Hooke's joints. Universal joints are joints used for connecting rigid rods together that have axes that are at least sometimes inclined and/or offset relative to one another. Some exemplary assemblies that include flexible mechanical couplings are constant velocity drivelines, propeller (prop) shafts, universal joint shafts, and double Cardan shafts.

Figure 4A:
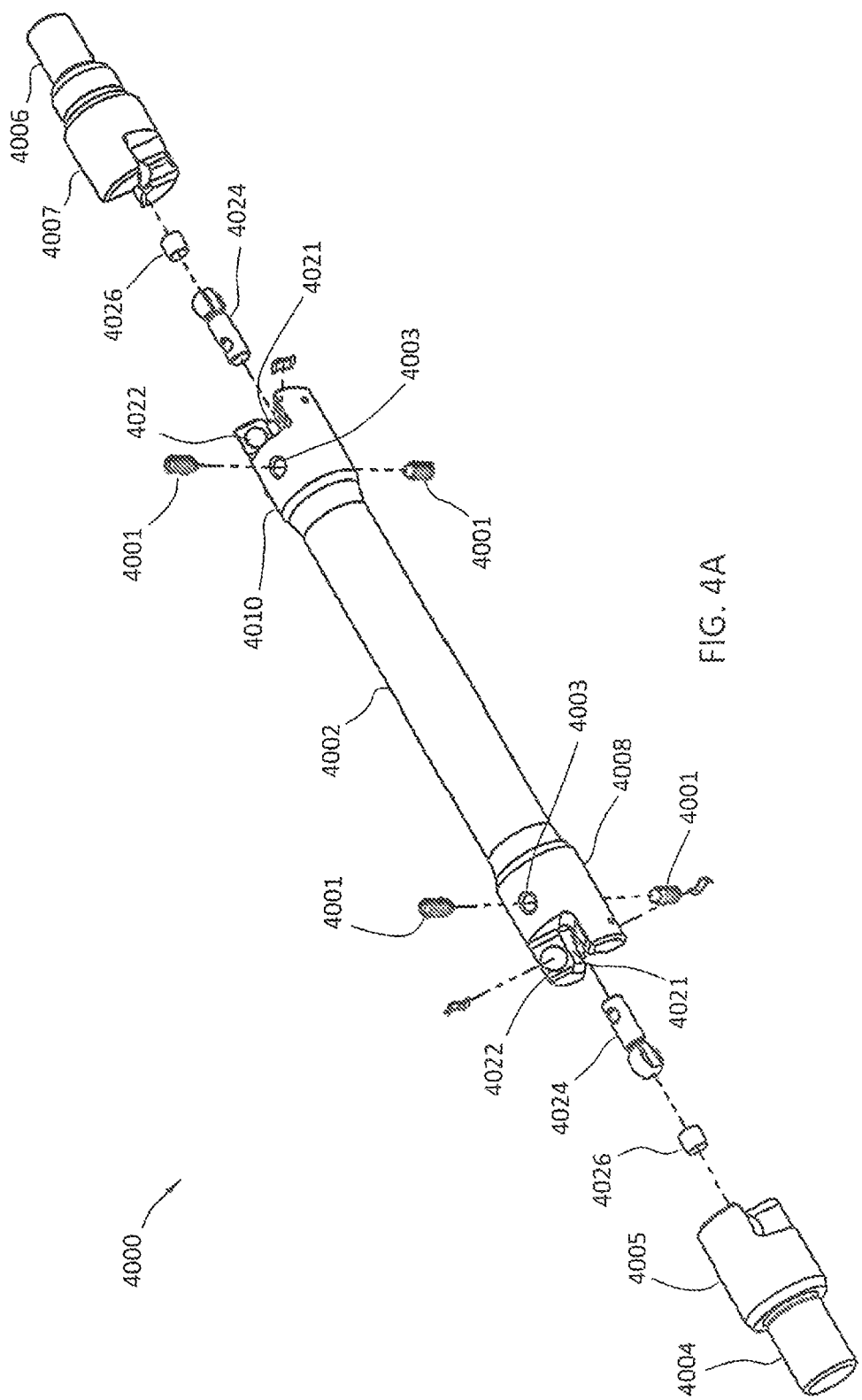
FIG. 4A is an exploded view of a portion of a driveline having an elongated universal joint with polycrystalline diamond power transmission surfaces thereon.
Figure 4D:
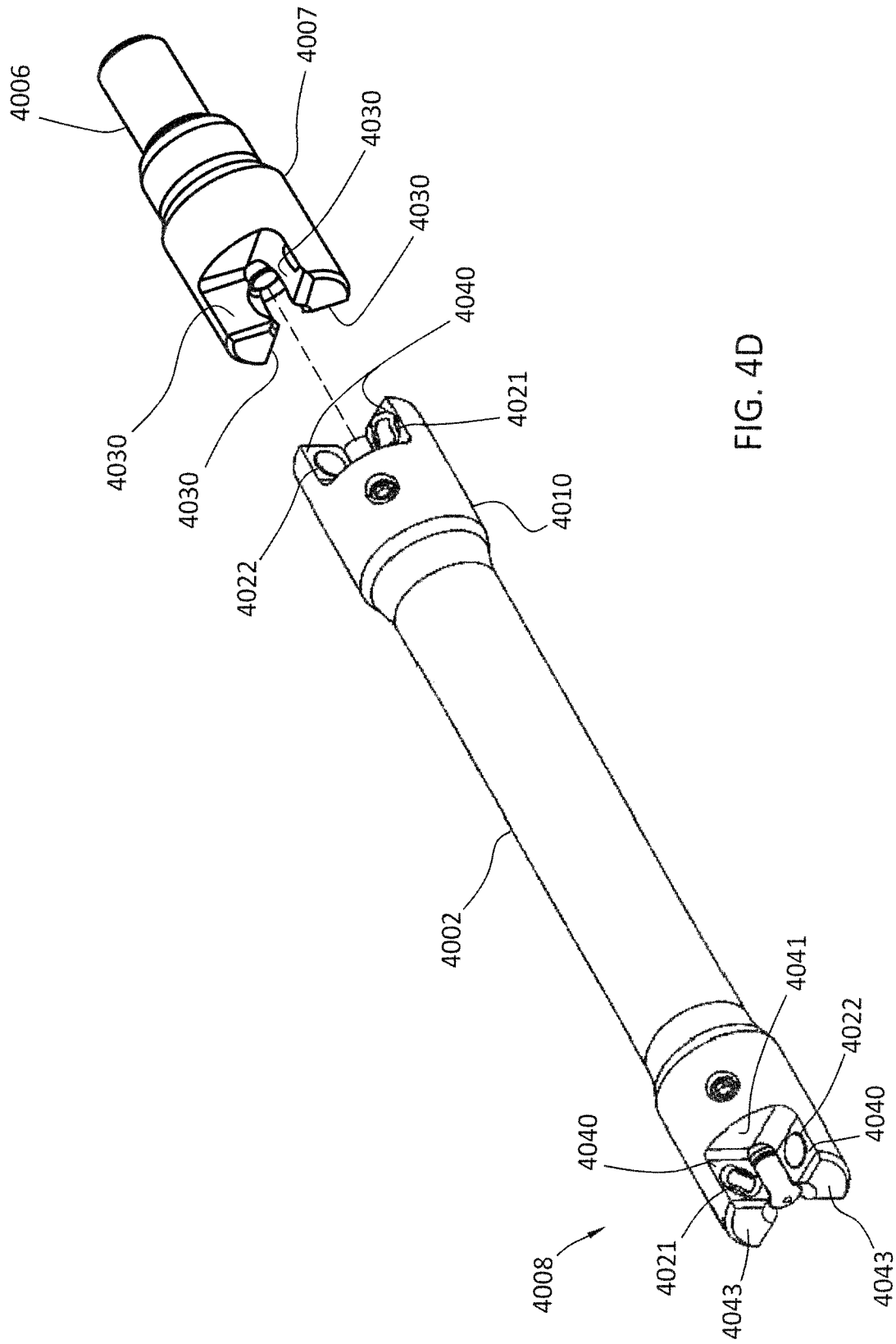
FIG. 4D is a disassembled view of portions of the driveline of FIG. 4A.

In some embodiments, the power transmission system disclosed herein includes an elongated universal joint for use in driveline applications, such as for use in drilling motors. With reference to FIGS. 4A-4D, a portion of an assembly having an elongated universal joint for use in driveline applications is depicted. Assembly 4000 includes shaft 4002. Shaft 4002 includes a hinge on each end thereof, including hinge 4008 and hinge 4010. As shown in FIG. 4B, hinge 4008 may be coupled with hinge 4005, which is coupled or integral with shaft 4004. Also, hinge 4010 may be coupled with hinge 4007, which is coupled or integral with shaft 4006. Also shown in the exploded view of FIG. 4A are set screws 4001, threaded holes 4003, locking pin 4024, and cups 4026. Locking pins 4024 have a ball end for mechanically coupling hinges 4008 and 4010 together and coupling hinges 4005 and 4007 together, and for providing a spherical bearing surface along with locating a pivot point for the hinges to rotate about. When assembled, the locking pins 4024 are turned 90 degrees to mechanically couple the respective hinges together. Set screws 4001 are then tightened to fix the position of the locking pins 4024 to prevent the two mating hinges from separating during operation. Cups 4026 have spherical cups machined therein and function as locaters for pivot points and as spherical bearing surfaces. Hinges 4008 and 4010 couple with hinges 4005 and 4007, respectively, via meshing the teeth 4009 thereof together. In at least some respects, hinges 4008, 4010, 4005, and 4007 are or are similar to gears, and function the same as or similar to gears in that the "teeth" of hinges mesh together for the transfer mechanical energy therebetween. The coupling of hinges 4008, 4010, 4005, and 4007 is the same as or similar to Hirth couplings or Curvic couplings.

Shaft 4004 may be coupled with or a portion of, for example, a motor that drives shaft 4004. When hinge 4005 is coupled with hinge 4008, rotation of shaft 4004 causes shaft 4002 to rotate. When hinge 4010 is coupled with hinge 4007, rotation of shaft 4002 causes shaft 4006 to rotate. Shaft 4006 may be coupled with or a portion of a component that is driven by assembly, such as a drill bit.

Each tooth of hinges 4008 and 4010 has tooth surfaces 4040 extending between root surface 4041 and top landing 4043. At least one tooth surface 4040 of each of hinges 4008 and 4010 has a polycrystalline diamond 4022 thereon. One of two adjacent teeth 4009 of hinges 4008 and 4010 has a polycrystalline diamond 4022 thereon and the other has a spring 4021 (here shown as a wave spring) thereon, providing compliance to assembly 4000 and reducing impact due to backlash as during transient events, such as at startup or shut-down. While not shown, the opposite side of hinges 4008 and 4010 may have the same arrangement. The tooth surfaces 4030 of hinges 4005 and 4007 include diamond solvent-catalyst. For example, in some embodiments, tooth surfaces 4030 of hinges 4005 and 4007 are steel. While springs 4021 are shown, the mechanical couplings disclosed herein are not limited to includes springs.

As shown in FIG. 4C, when hinges 4005 and 4008 are engaged, the teeth of hinge 4008 are positioned between adjacent teeth of hinge 4005, and the teeth of hinge 4005 are positioned between adjacent teeth of hinge 4008. The polycrystalline diamonds 4022 are engaged with the tooth surfaces 4030, such that the engagement between the hinges 4005 and 4008 is at least partially interfaced via engagement between the surfaces of the polycrystalline diamonds 4022 tooth surfaces 4030. The engagement between hinges 4007 and 4010 is the same or substantially similar to that of hinges 4005 and 4008. In operation, assembly 4000 exploits excess backlash and looseness of fit between the hinges in order to accommodate various ranges of motions. For example, assembly 4000 exploits excess backlash and looseness of fit between the hinges in order to accommodate axial, radial, and/or angular misalignment within assembly 4000. In some embodiments, the polycrystalline diamond surfaces and the diamond solvent-catalyst surface are arranged within assembly 4000 such that, regardless of the direction of rotation (clockwise or counterclockwise) of the assembly 4000, polycrystalline diamond surfaces are engaged with diamond solvent-catalyst surfaces in the assembly 4000 during rotation. For example, rather than springs 4021 on the surfaces opposite the polycrystalline diamonds 4022, the springs 4021 of hinges 4008 and 4010 could be replaced with polycrystalline diamonds and all of the tooth surfaces 4030 of hinges 4005 and 4007 could be diamond solvent-catalyst surfaces such that, regardless of the direction or rotation of assembly 4000, polycrystalline diamond surfaces are engaged with diamond solvent-catalyst surfaces in the assembly 4000. Alternatively, rather than springs 4021 on the surfaces opposite the polycrystalline diamonds 4022, the springs 4021 of hinges 4008 and 4010 could be replaced with diamond solvent-catalyst surfaces, the tooth surfaces 4030 of hinges 4005 and 4007 that engage with the diamond solvent-catalyst surfaces of hinges 4008 and 4010 could be polycrystalline diamonds, and the tooth surfaces 4030 of hinges 4005 and 4007 that engage with the polycrystalline diamonds 4022 of hinges 4008 and 4010 could be diamond solvent-catalyst surfaces such that, regardless of the direction or rotation of assembly 4000, polycrystalline diamond surfaces are engaging with diamond solvent-catalyst surfaces in the assembly 4000.

As can be seen in FIG. 4C, the opposing engagement surface is crowned, with tooth surface 4030 positioned outward relative to curved surfaces 4032 and 4037. Tooth surface 4030 has a width 4031 that is narrower than a width 4020 of the engagement surface of polycrystalline diamond 4022. This projection of tooth surface 4030 from tooth 4009 and relative narrowness of tooth surface 4030 relative to polycrystalline diamond 4022 reduces or eliminates the occurrence of edge contact between the polycrystalline diamond 4022 and tooth surface 4030, such that the polycrystalline diamond 4022 does not gouge the diamond reactive material of tooth surface 4030 during operation thereof.

Figure 5A:
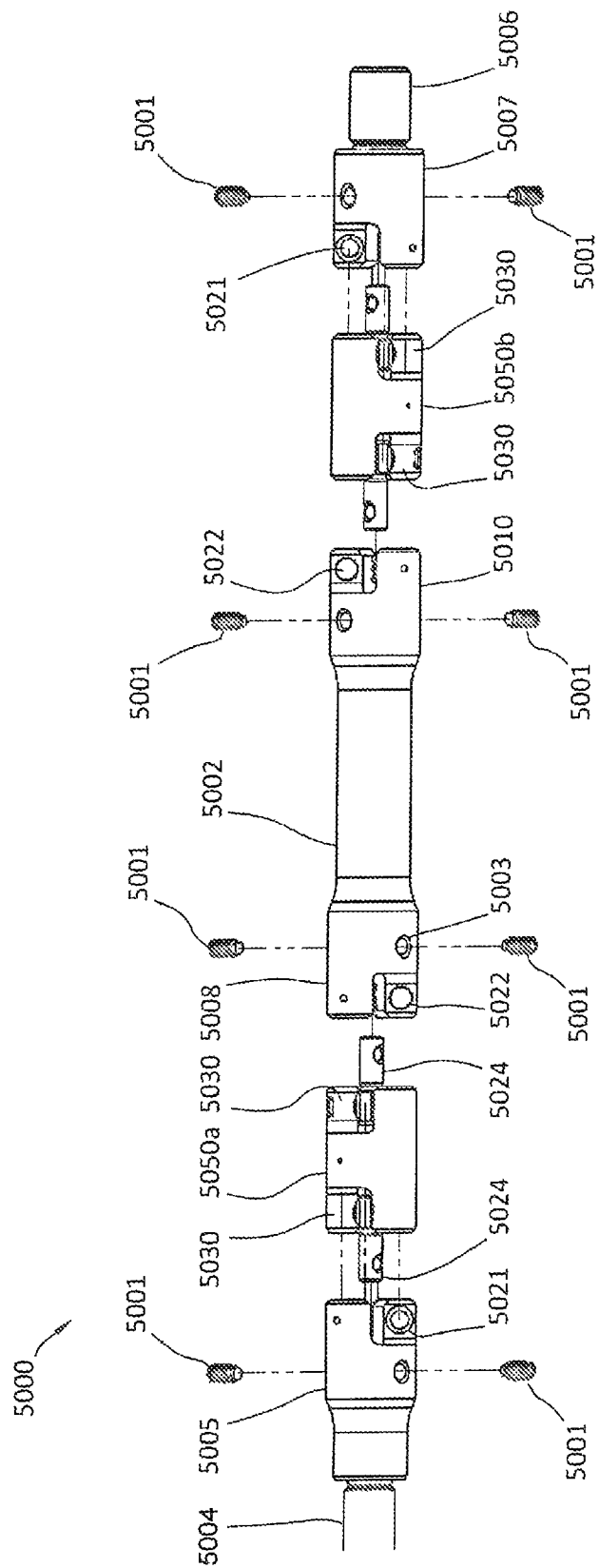
FIG. 5A is an exploded view of a portion of a driveline having a double Cardan universal joint with polycrystalline diamond power transmission surfaces thereon.

In some embodiments, the power transmission system disclosed herein includes a double Cardan universal joint for use in driveline applications, such as for use in drilling motors. Assemblies with double Cardan universal joints include two sets of universal joints. In operation, when the sets of universal joints are aligned, assemblies with double Cardan universal joints can provide constant velocity. With reference to FIGS. 5A-5F, a portion of an assembly having a double Cardan universal joint for use in driveline applications is depicted. Assembly 5000 is substantially similar to assembly 4000, with the addition of shaft couplers 5050a and 5050b. Assembly 5000 includes shaft 5002. Shaft 5002 includes a hinge on each end thereof, including hinge 5008 and hinge 5010. Assembly 5000 includes shaft couplers 5050a and 5050b. Assembly includes hinge 5005 coupled or integral with shaft 5004, and hinge 5007 coupled or integral with shaft 5006. Hinge 5008 may be coupled with one end of shaft coupler 5050a, and hinge 5005 may be coupled with the opposite end of shaft coupler 5050a. Hinge 5010 may be coupled with one end of shaft coupler 5050b, and hinge 5007 may be coupled with the opposite end of shaft coupler 5050b. Also shown in the exploded view of FIG. 5A are set screws 5001, threaded holes 5003, and locking pins 5024.

As shown in FIG. 5B, each of hinges 5008, 5010, 5005, and 5007, as well as shaft couplers 5050a and 5050b include teeth 5009. Shaft coupler 5050a couples with hinges 5008 and 5005 via meshing of the teeth 5009 thereof, and shaft coupler 5050b couples with hinges 5010 and 5007 via meshing of the teeth 5009 thereof. In at least some respects, hinges 5008, 5010, 5005, and 5007 and shaft couplers 5050a and 5050b are or are similar to gears, and function the same as or similar to gears in that the teeth thereof mesh together for the transfer mechanical energy therebetween. The coupling of hinges 5008, 5010, 5005, and 5007 is the same as or similar to Hirth couplings or Curvic couplings.

Shaft 5004 may be coupled with or a portion of, for example, a motor that drives shaft 5004. When hinge 5005 is coupled with hinge 5008 via shaft coupler 5050a, rotation of shaft 5004 causes shaft coupler 5050a to rotate, and rotation of shaft coupler 5050a causes shaft 5002 to rotate. When hinge 5010 is coupled with hinge 5007 via shaft coupler 5050b, rotation of shaft 5002 causes shaft coupler 5050b to rotate, and rotation of shaft coupler 5050b causes shaft 5006 to rotate. Shaft 5006 may be coupled with or a portion of a component that is driven by assembly, such as a drill bit.

With reference to FIGS. 5D, 5G, and 5H, each tooth 5009 of hinges 5005, 5007, 5008, and 5010 has tooth surfaces 5040 extending between a root surface 5041 and top landing 5043. At least one tooth surface 5040 of each of hinges 5008, 5010, 5005, and 5007 has a polycrystalline diamond 5022 thereon. As shown in FIGS. 5D, 5G, and 5H, each tooth 5009 has a polycrystalline diamond 5022 on one tooth surface 5040 thereof and a spring 5021 on the other tooth surface 5040 thereof. The tooth surfaces 5030 of shaft couplers 5050a and 5050b include diamond solvent-catalyst. For example, in some embodiments, tooth surfaces 5030 are steel. As such, when assembled, the polycrystalline diamonds 5022 are engaged with the tooth surfaces 5030, such that the engagement between the hinges 5005, 5007, 5008, and 5010 with shaft couplers 5050a and 5050b is at least partially interfaced via engagement between the surfaces of the polycrystalline diamonds 5022 tooth surfaces 5030. In some embodiments, the polycrystalline diamond surfaces and the diamond solvent-catalyst surface are arranged within assembly 5000 such that, regardless of the direction of rotation (clockwise or counterclockwise) of the assembly 5000, polycrystalline diamond surfaces are engaged with diamond solvent-catalyst surfaces in the assembly 5000 during rotation. For example, rather than springs 5021 on the surfaces opposite the polycrystalline diamonds 5022, the springs 5021 of any one or more of hinges 5005, 5007, 5008 and 5010 could be replaced with polycrystalline diamonds and all of the tooth surfaces 5030 of couplers 5050a and 5050b could be diamond solvent-catalyst surfaces such that, regardless of the direction or rotation of assembly 5000, polycrystalline diamond surfaces are engaged with diamond solvent-catalyst surfaces in the assembly 5000. Alternatively, the springs 5021 of any one or more of hinges 5005, 5007, 5008 and 5010 could be replaced with diamond solvent-catalyst surfaces, one or more of the tooth surfaces 5030 that engage with the diamond solvent-catalyst surfaces of hinges 5005, 5007, 5008 and 5010 could be polycrystalline diamonds, and the tooth surfaces 5030 that engage with the polycrystalline diamonds 5022 could be diamond solvent-catalyst surfaces such that, regardless of the direction or rotation of assembly 5000, polycrystalline diamond surfaces are engaging with diamond solvent-catalyst surfaces in the assembly 5000.

FIG. 6 depicts an exemplary system 10. System 10 includes motor 12. Motor 12 is coupled with power transmission system 14. Power transmission system 14 is coupled with component 16. Power transmission system 14 may be any of the power transmission systems disclosed herein that include polycrystalline diamond power transmission surfaces engaged with diamond solvent-catalyst power transmission surfaces. Power transmission system 14 may be or include a set of gears and/or a universal joint. For example, power transmission system 14 may be or include any of the gears shown in FIGS. 1A-3C or any of the universal joints shown in FIGS. 4A-5F. In operation, motor 12 drives power transmission system 14, such as via rotating a drive shaft coupled with or integral with the power transmission system 14, and power transmission system 14 drives the component 16, such as via rotating a shaft coupled with or integral with the component 16. The component may be any of numerous components, as described elsewhere herein. Some examples of components include, but are not limited to, drill bits and propellers.

Polycrystalline Diamond Bearing Elements

In some embodiments, the polycrystalline diamond surfaces disclosed herein are surfaces of polycrystalline diamond elements that are coupled with or otherwise incorporated into or with the power transmission system components (e.g., gears or universal joints) disclosed herein. For example, the polycrystalline diamond elements may be coupled with the power transmission surfaces of the power transmission systems. In some embodiments, the polycrystalline diamond elements are positioned to be flush with existing power transmission surfaces. In other embodiments, the polycrystalline diamond elements are positioned to be raised above existing power transmission surfaces. Such polycrystalline diamond elements may be or include thermally stable polycrystalline diamond, either supported or unsupported by tungsten carbide, or polycrystalline diamond compact (PDC). In certain applications, the polycrystalline diamond elements disclosed herein have increased cobalt content transitions layers between the outer polycrystalline diamond surface and a supporting tungsten carbide slug. The polycrystalline diamond elements may be supported by tungsten carbide, or may be unsupported. "standalone" polycrystalline diamond elements that are mounted directly to the power transmission system component. The polycrystalline diamond elements may by non-leached, leached, leached and backfilled, thermally stable, coated via chemical vapor deposition (CVD), or processed in various ways as known in the art.

In some embodiments, the engagement surfaces of the polycrystalline diamond elements disclosed herein are planar, convex, or concave. In some embodiments, wherein the engagement surfaces of the polycrystalline diamond elements are concave, the concave engagement surfaces are oriented with the axis of the concavity in line with the circumferential rotation of the respective power transmission system component. In some embodiments, the polycrystalline diamond elements have beveled edges. The polycrystalline diamond elements may have diameters as small as 3 mm (about ⅛") or as large as 75 mm (about 3"), depending on the application. Typically, the polycrystalline diamond elements have diameters between 8 mm (about 5/16") and 25 mm (about 1").

Although the polycrystalline diamond elements are most commonly available in cylindrical shapes, it is understood that the technology of the application may be practiced with polycrystalline diamond elements that are square, rectangular, oval, any of the shapes described herein with reference to the Figures, or any other appropriate shape known in the art. In some applications, one or more convex, contoured polycrystalline diamond elements are mounted on the power transmission system component (e.g., gear or mechanical coupling) in sliding and/or rolling contact with an opposing surface of another power transmission system component (e.g., another gear or portion of the universal joint).

The polycrystalline diamond elements may be arranged in any pattern, layout, spacing or staggering within the power transmission system to provide the desired interfacing of contact, without concern for the need for overlapping contact with polycrystalline diamond elements engagement surfaces on the opposing power transmission system component. The polycrystalline diamond elements disclosed herein are, in some embodiments, not shaped to conform to the opposing engagement surface. The polycrystalline diamond elements disclosed herein are, in other embodiments, shaped to conform to the opposing engagement surface.

One performance criterion is that the polycrystalline diamond element is configured and positioned in such a way as to preclude any edge contact with the opposing engagement surface or component. In some aspects, the polycrystalline diamond elements are subjected to edge radius treatment.

Opposing Engagement Surface

In some aspects, the opposing engaging surface (e.g., of the opposing gear or portion of the universal joint), that is, the surface that is engaged with the polycrystalline diamond surface, has carbon applied thereto. In some such aspects, the carbon is applied to the opposing bearing surface prior to engagement with the engagement surface. For example, the opposing bearing surface may be saturated with carbon. Without being hound by theory, it is believed that such application of carbon reduces the ability of the diamond solvent-catalyst in the opposing engagement surface to attract carbon through graphitization of the surface of the polycrystalline diamond element. That is, the carbon that is applied to the opposing surface functions as a sacrificial layer of carbon. In addition, the opposing surface may be treated via any of the methods disclosed and described in the '758 Application. The opposing surfaces disclosed herein may be surfaces that contain at least 2 wt. % of diamond solvent-catalyst.

With reference to FIGS. 1A-5F, some exemplary opposing engagement surfaces include first gear tooth surfaces 118, 218, and 318, and tooth surfaces 4030 and 5030. In some embodiments, the opposing engagement surfaces are or include a metal or metal alloy that contains at least 2 wt. % of a diamond solvent-catalyst based on a total weight of the metal or metal alloy. The diamond solvent-catalyst may be iron, cobalt, nickel, ruthenium, rhodium, palladium, chromium, manganese, copper, titanium, tantalum, or alloys thereof. In some embodiments, the opposing engagement surfaces are or include a metal or metal alloy that contains from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst based on a total weight of the metal or metal alloy (e.g., from 2 to 100 wt. %, of iron, cobalt, nickel, ruthenium, rhodium, palladium, chromium, manganese, copper, titanium, tantalum, or alloys thereof).

Applications

In certain embodiments, the power transmission systems disclosed herein are suitable for deployment and use in harsh environments (e.g., downhole). In some such aspects, the power transmission systems are less susceptible to fracture than power transmission systems that include a polycrystalline diamond engagement surface engaged with another polycrystalline diamond engagement surface. In certain aspects, such harsh environment suitable power transmission systems provide enhanced service value in comparison with power transmission systems that include a polycrystalline diamond engagement surface engaged with another polycrystalline diamond engagement surface.

As would be understood by one skilled in the art, various forms of gear failure can occur including, but not limited to, bending fatigue, contact fatigue, wear, scuffing, overload, and cracking. Without being bound by theory, it is believed that gears incorporating the power transmission surfaces disclosed herein (i.e., a polycrystalline diamond power transmission surface engaged with a diamond solvent-catalyst power transmission surface) will exhibit a reduced occurrence of such gear failures. It is further believed that a reduction of universal joint failure will also occur for universal joints that incorporate the power transmission surfaces disclosed herein.

Embodiments

Certain embodiments will now be described.

Embodiment 1. A power transmission system, the system comprising: a first component, the first component having at least one power transmission surface thereon, the at least one power transmission surface comprising polycrystalline diamond; a second component, the second component having at least one opposing power transmission surface thereon, the at least one opposing power transmission surface comprising a material containing at least 2 weight percent of diamond solvent-catalyst based on a total weight of the material; wherein the first component is movably coupled with the second component such that the polycrystalline diamond is engaged with the diamond solvent-catalyst and such that movement of one of the first and second components drives movement of the other of the first and second components.

Embodiment 2. The power transmission system of embodiment 1, wherein the first component is a first gear, wherein the second component is a second gear, and wherein the first and second gears are meshed.

Embodiment 3. The power transmission system of embodiment 2, wherein the at least one power transmission surface is at least one gear tooth surface of the first gear, and wherein the at least one opposing power transmission surface is at least one gear tooth surface of the second gear.

Embodiment 4. The power transmission system of embodiment 2 or 3, wherein the first and second gears are helical gears, spur gears, a worm drive, skew gears, double helical gears, bevel gears, spiral bevel gears, hypoid gears, crown gears, non-circular gears, rack and pinion gears, epicycle gears, sun and planet gears, harmonic gears, cage gears, cycloidal gears.

Embodiment 5. The power transmission system of any of embodiments 2 to 4, wherein each of the first and second gears are coupled with drives shafts.

Embodiment 6. The power transmission system of embodiment 1, wherein the first component is a first cogwheel, wherein the second component is a second cogwheel, and wherein the first and second cogwheels are meshed.

Embodiment 7. The power transmission system of embodiment 1, wherein the power transmission system is a universal joint.

Embodiment 8. The power transmission system of embodiment 7, wherein the universal joint includes the first component coupled with the second component and with a third component, wherein the first component is a first shaft having hinges thereon, wherein the second and third components are second and third shafts, respectively, each having a hinge thereon, wherein the first shaft is coupled with the second and third shafts via the hinges, and wherein the at least one power transmission surface is on the hinges on the first shaft and the at least one opposing power transmission surface is on the hinges of the second and third shafts.

Embodiment 9. The power transmission system of embodiment 8, wherein the hinges of the first shaft include at least one power transmission surface comprising a spring thereon, wherein the springs are engaged with diamond solvent-catalyst on the hinges of the second and third shafts.

Embodiment 10. The power transmission system of embodiment 7, wherein the universal joint is a double Cardan universal joint.

Embodiment 11. The power transmission system of embodiment 10, wherein the double Cardan universal joint includes the first component coupled with the second component and with a third component, wherein the first component is a first shaft having hinges thereon, the second and third components are shaft couplers having hinges thereon, wherein the first shaft is coupled with the shaft couplers via the hinges, and wherein the at least one power transmission surface is on the hinges on the first shaft and the at least one opposing power transmission surface is on the hinges of the shaft couplers.

Embodiment 12. The power transmission system of embodiment 10, wherein the hinges of the first shaft include at least one power transmission surface comprising a spring thereon, wherein the springs are engaged with diamond solvent-catalyst on the hinges of the second and third components.

Embodiment 13. The power transmission system of embodiment 11, further comprising a second shaft having hinges thereon and a third shaft having hinges thereon, wherein the hinges of the second and third shaft have power transmission surfaces comprising polycrystalline diamond, and wherein the second shaft and third shaft are coupled with the second and third components, respectively, via the hinges such that the polycrystalline diamond of the second and third shafts is engaged with the diamond solvent-catalyst of the second and third components.

Embodiment 14. The power transmission system of any of embodiments 1 to 13, wherein the opposing power transmission surface is hardened, plated, coated, or cladded.

Embodiment 15. The power transmission system of any of embodiments 1 to 14, wherein the material of the opposing power transmission surface comprises from 5 to 100 wt. % of the diamond solvent-catalyst based on the total weight of the material.

Embodiment 16. The power transmission system of any of embodiments 1 to 15, wherein the diamond solvent-catalyst is a hardfacing, coating, or plating.

Embodiment 17. The power transmission system of any of embodiments 1 to 16, wherein the diamond solvent-catalyst comprises iron, cobalt, nickel, ruthenium, rhodium, palladium, chromium, manganese, copper, titanium, or tantalum.

Embodiment 18. The power transmission system of any of embodiments 1 to 17, wherein the material of the opposing power transmission surface is softer than a superhard material.

Embodiment 19. The power transmission system of any of embodiments 1 to 18, wherein a surface of the polycrystalline diamond has a surface finish of less than 5 µin.

Embodiment 20. A method of interfacing engagement between power transmission surfaces of a power transmission system, the method comprising: positioning polycrystalline diamond on a power transmission surface of a first component; providing a second component, the second component having an opposing power transmission surface, the opposing power transmission surface comprising a material containing at least 2 weight percent of diamond solvent-catalyst based on a total weight of the material; movably engaging the first component with the second component such that the polycrystalline diamond is engaged with the diamond solvent-catalyst and such that movement of one of the first and second components drives movement of the other of the first and second components.

Embodiment 21. The method of embodiment 20, wherein the first and second components are meshed gears.

Embodiment 22. The method of embodiment 20, wherein the first and second components are a universal joint.

Embodiment 23. The method of embodiment 20, wherein the power transmission system is in accordance with any of embodiments 1 to 19.

Embodiment 24. A power transmission system, the system comprising: a power transmission surface comprising polycrystalline diamond; an opposing power transmission surface comprising a material containing at least 2 weight percent of diamond solvent-catalyst based on a total weight of the material; wherein the power transmission surface is engaged with the opposing power transmission surface such that the polycrystalline diamond is engaged with the diamond solvent-catalyst.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system including mechanical power transmission, the system comprising:
   a first component, the first component comprising a first power transmission surface;
   a second component, the second component comprising a second power transmission surface, wherein one of the first and second components comprises a polycrystalline diamond element;
   wherein one of the first and second power transmission surfaces is a diamond engagement surface of the polycrystalline diamond element, the diamond engagement surface having a surface finish of at most 20 µin Ra, and wherein the other of the first and second power transmission surfaces is a metal surface comprising a metal, the metal containing at least 2 weight percent of diamond solvent-catalyst based on a total weight of the metal, wherein the first component is coupled with the second component such that the diamond engagement surface is engaged with the metal surface;
   a drive component coupled with the first component; and
   a driven component coupled with the second component;
   wherein the drive component drives the first component, the first component drives the second component, and the second component drives the driven component.

2. The system of claim 1, wherein the drive component comprises a motor.

3. The system of claim 2, wherein the drive component comprises an electric motor or a hydraulic motor.

4. The system of claim 1, wherein the drive component comprises an engine.

5. The system of claim 4, wherein the drive component comprises an internal combustion engine.

6. The system of claim 1, wherein the drive component comprises a turbine.

7. The system of claim 6, wherein the drive component comprises a gas turbine, a wind turbine, a water turbine, or a steam turbine.

8. The system of claim 6, wherein the drive component comprises a drilling motor turbine.

9. The system of claim 1, wherein the driven component comprises a pump, a generator, a driveline, a machine tool spindle or chuck, a winch, a drill bit, a power take off unit, a propeller shaft, or an axle shaft.

10. The system of claim 1, wherein the system comprises a gearbox, and wherein the first and second components are components of the gearbox.

11. The system of claim 1, wherein the system comprises a drivetrain, and wherein the first and second components are components of the drivetrain.

12. The system of claim 1, wherein the system comprises a drilling motor, and wherein the first and second components are components of the drilling motor.

13. The system of claim 12, wherein the drilling motor comprises a motor, a drive shaft, and a drill bit, wherein the first and second components are components of the drive shaft, wherein the drive component comprises the motor, and wherein the driven component comprises the drill bit.

14. The system of claim 1, wherein the first and second components are portions of a turbine, a pump, a compressor, a combustion engine, a hard drive, a centrifuge, a brake, a clutch, or a motor.

15. The system of claim 1, wherein the first and second components are portions of mining equipment, construction equipment, an automotive part, agricultural equipment, an aircraft part, marine equipment, a rail car, medical equipment, or an amusement ride.

16. The system of claim 1, wherein the first component is a first gear, wherein the second component is a second gear, and wherein the first and second gears are meshed.

17. The system of claim 16, wherein the first and second gears are helical gears, spur gears, a worm gear and a worm, skew gears, double helical gears, bevel gears, spiral bevel gears, hypoid gears, crown gears, non-circular gears, rack and pinion gears, epicyclic gears, sun and planet gears, harmonic gears, cage gears, or cycloidal gears.

18. The system of claim 16, wherein the first and second gears comprises an internal gear.

19. The system of claim 1, wherein the first component is a first cogwheel, wherein the second component is a second cogwheel, and wherein the first and second cogwheels are meshed.

20. The system of claim 1, wherein the system comprises a mechanical coupling, and wherein the first and second components are components of the mechanical coupling.

21. The system of claim 20, wherein the mechanical coupling is a flexible mechanical coupling.

22. The system of claim 20, wherein the mechanical coupling comprises a jaw coupling, a claw coupling, or a knuckle joint.

23. The system of claim 20, wherein the mechanical coupling comprises a universal joint.

24. The system of claim 23, wherein the universal joint is a double Cardan universal joint.

25. The system of claim 1, wherein the metal comprises from 55 to 100 wt. % of the diamond solvent-catalyst based on the total weight of the metal.

26. The system of claim 1, wherein the diamond solvent-catalyst is selected from the group consisting of: iron, cobalt, nickel, ruthenium, rhodium, palladium, chromium, manganese, copper, titanium, tantalum, and combinations thereof.

27. The system of claim 1, wherein the metal is softer than a superhard material.

28. The system of claim 1, wherein one of the first and second power transmission surfaces comprises a plurality of discrete polycrystalline diamond elements, each polycrystalline diamond element having a diamond engagement surface with a surface finish of at most 20 μin Ra.

29. The system of claim 1, wherein the diamond engagement surface is in sliding contact, rolling contact, or combinations thereof with the metal surface.

30. The system of claim 1, wherein the polycrystalline diamond element is a polycrystalline diamond compact.

31. The system of claim 1, wherein the metal is a metal alloy.

32. A system including mechanical power transmission, the system comprising:
a first component, the first component comprising a first power transmission surface;
a second component, the second component comprising a second power transmission surface, wherein one of the first and second components comprises a polycrystalline diamond element;
wherein one of the first and second power transmission surfaces is a diamond engagement surface of the polycrystalline diamond element, the diamond engagement surface having a surface finish of at most 20 μin Ra, and wherein the other of the first and second power transmission surfaces is a metal surface comprising a metal, the metal containing at least 2 weight percent of iron, cobalt, nickel, ruthenium, rhodium, palladium, chromium, manganese, copper, titanium, or tantalum based on a total weight of the metal, wherein the first component is coupled with the second component such that the diamond engagement surface is engaged with the metal surface;
a drive component coupled with the first component; and
a driven component coupled with the second component;
wherein the drive component drives the first component, the first component drives the second component, and the second component drives the driven component.

33. A method of driving a component with a mechanical power transmission, the method comprising:
coupling a first component with a second component, wherein the first component comprises a first power transmission surface and the second component comprises a second power transmission surface, wherein one of the first and second components comprises a polycrystalline diamond element;
wherein one of the first and second power transmission surfaces is a diamond engagement surface of the polycrystalline diamond element, the diamond engagement surface having a surface finish of at most 20 μin Ra, and wherein the other of the first and second power transmission surfaces is a metal surface comprising a metal, the metal containing at least 2 weight percent of diamond solvent-catalyst based on a total weight of the metal, wherein the first component is coupled with the second component such that the diamond engagement surface is engaged with the metal surface;
coupling a drive component with the first component;
coupling a driven component with the second component;
driving the first component with the drive component;
driving the second component with the first component; and
driving the driven component with the second component.

* * * * *